US008046572B2

(12) United States Patent  
Ota et al.

(10) Patent No.: US 8,046,572 B2
(45) Date of Patent: Oct. 25, 2011

(54) BOOTING SYSTEM, BOOT PROGRAM, AND METHOD THEREFOR

(75) Inventors: Takeaki Ota, Tokyo (JP); Takashi Sakamoto, Tokyo (JP)

(73) Assignee: Hewlett-Packard Development Company, L.P., Houston, TX (US)

( * ) Notice: Subject to any disclaimer, the term of this patent is extended or adjusted under 35 U.S.C. 154(b) by 721 days.

(21) Appl. No.: 12/104,908

(22) Filed: Apr. 17, 2008

(65) Prior Publication Data

US 2008/0263349 A1    Oct. 23, 2008

(30) Foreign Application Priority Data

Apr. 20, 2007  (JP) ................................ 2007-111305

(51) Int. Cl.
*G06F 9/00* (2006.01)
*G06F 15/177* (2006.01)
*G06F 1/00* (2006.01)
*G06F 11/00* (2006.01)

(52) U.S. Cl. ................................ 713/2; 713/300; 714/14

(58) Field of Classification Search .............. 713/2, 300; 714/14
See application file for complete search history.

(56) References Cited

U.S. PATENT DOCUMENTS

| 6,857,069 | B1 | 2/2005 | Rissmeyer et al. |
| 7,073,013 | B2 * | 7/2006 | Lasser ........................... 711/102 |
| 2004/0128495 | A1 | 7/2004 | Hensley |
| 2005/0210228 | A1 | 9/2005 | Miller et al. |

FOREIGN PATENT DOCUMENTS

| EP | 1560113 | 8/2005 |
| JP | 272394 | 6/1996 |
| JP | 2004-070690 | 3/2004 |
| JP | 2005-327216 | 11/2005 |
| JP | 2006-285798 | 10/2006 |
| WO | WO 00/17750 | 3/2000 |

OTHER PUBLICATIONS

European Search Report, Jul. 18, 2008.

* cited by examiner

*Primary Examiner* — Thomas Lee
*Assistant Examiner* — Samantha Hoang

(57) ABSTRACT

A booting system, a boot program, and a method therefor are provided. A boot source device and a boot target device are connected to each other via a transfer interface. The transfer interface is an interface where booting is supported by a BIOS of the boot target device. The boot source device transfers a first object corresponding to booting data which allows the boot target device to establish and use a connection including an interface other than the transfer interface, which is not supported by the BIOS, via the transfer interface. After the boot target device is enabled to use the interface other than the transfer interface, the boot source device transfers a second object corresponding to booting data for booting up an OS of the boot target device or the like via the transfer interface and transfer interfaces and to the boot target device to boot the boot target device.

12 Claims, 16 Drawing Sheets

DEVICE BOOTING SYSTEM  1

2,4

FIG. 3
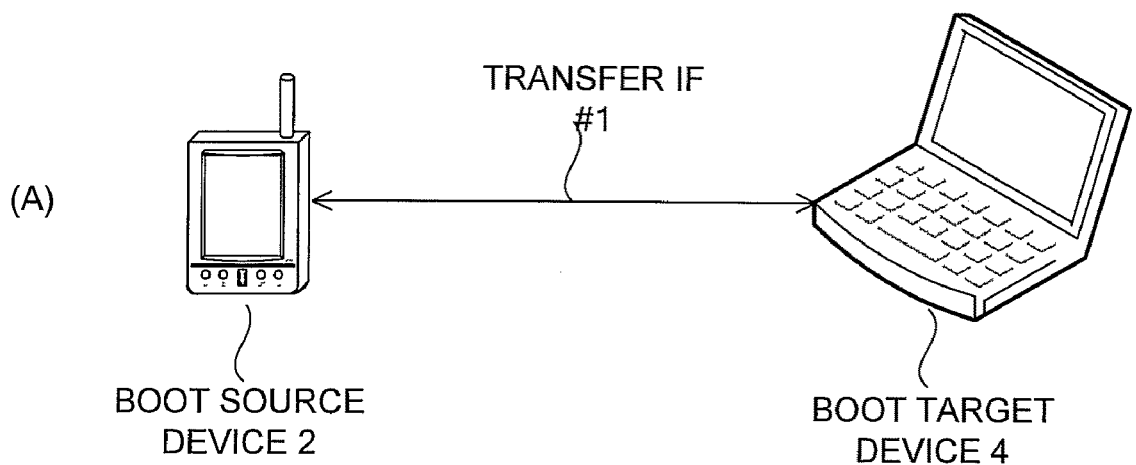
(A) BOOT SOURCE DEVICE 2 — TRANSFER IF #1 — BOOT TARGET DEVICE 4
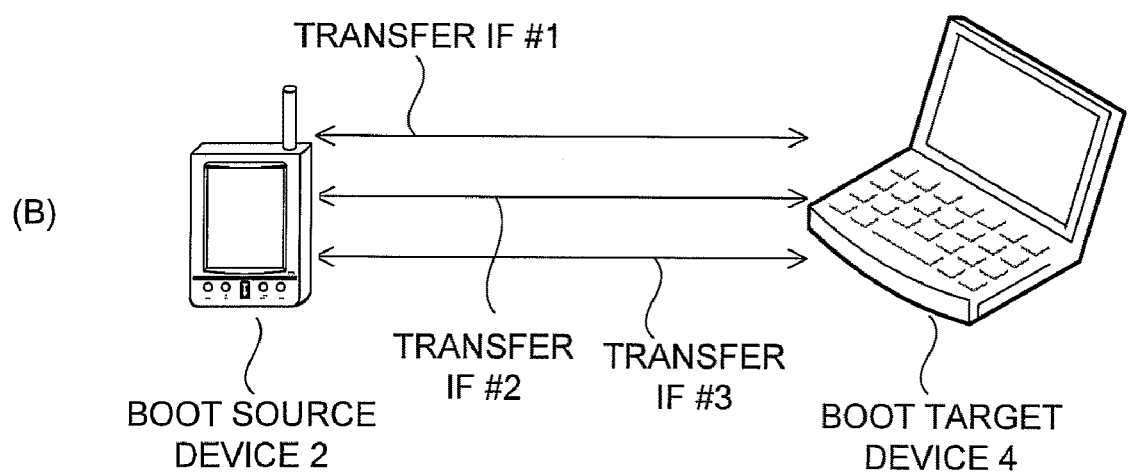
(B) BOOT SOURCE DEVICE 2 — TRANSFER IF #1, TRANSFER IF #2, TRANSFER IF #3 — BOOT TARGET DEVICE 4

FIG. 7
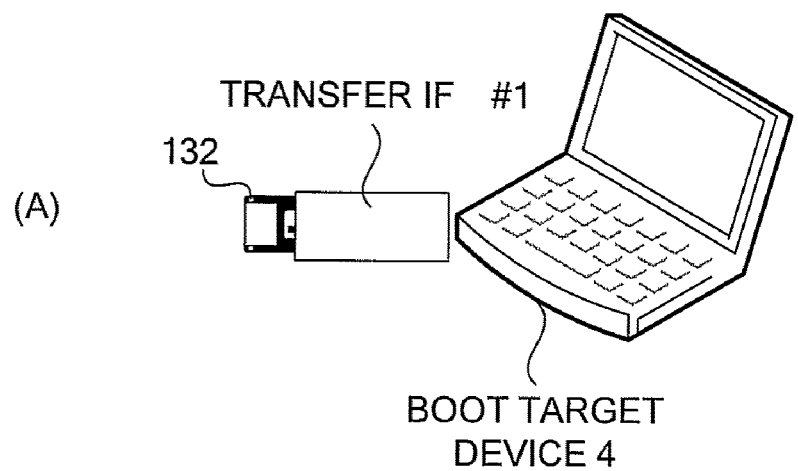
(A)
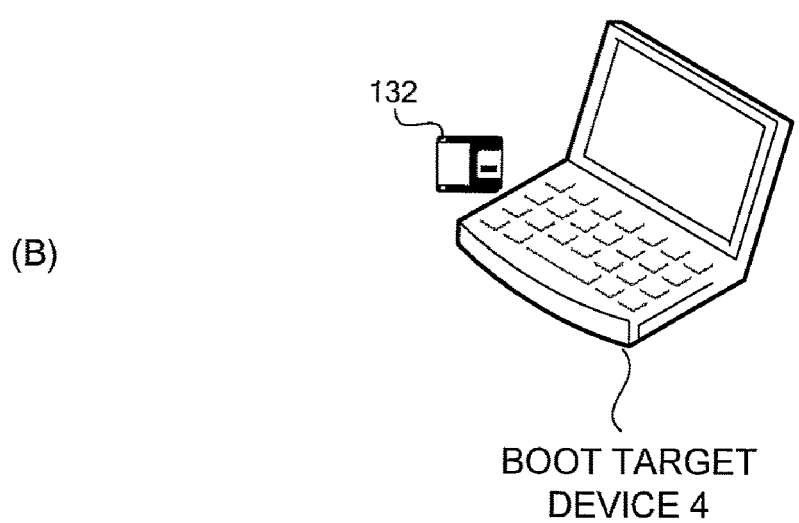
(B)

BOOT TARGET DEVICE PROGRAM
(FIRST STAGE)  40

TRANSFER CONTROLLER 44

OS BOOT UP HANDLER 46

UI CONTROLLER 50

BOOTING SYSTEM, BOOT PROGRAM, AND METHOD THEREFOR

PRIORITY CLAIM

The present invention claims priority under 35 U.S.C. 119 to Japanese Patent Application No. JP2007-111305, filed on Apr. 20, 2007, which is incorporated by reference in its entirety.

TECHNICAL FIELD

The present invention relates to a booting system, a boot program, and a method therefor. The present invention relates, in particular, to a usage pattern, in which a boot target device operating as a general-purpose computer device is booted by a boot source device corresponding to an external device or an external storage device for use.

BACKGROUND

Recently, due to the proliferation of general-purpose computer devices and a variety of other factors (e.g., the increased speed of various interfaces used in the general-purpose computer devices, the increase in capacity of a storage device (or a storage medium), the increased speed of a network, the security reasons and the like), the number of usage patterns, in which the general-purpose computer device is booted not only by an internal storage device (e.g., a hard disk drive or a semiconductor disk included in the general-purpose computer device) but also by an external storage device for use, has been increasing again.

These usage patterns were widely used as a method of booting the general-purpose computer device by using a floppy (registered trademark) disk to use the general-purpose computer even before the hard disk drive is generally used. Thereafter, the number of usage patterns decreased as an OS or an application used in the general-purpose computer established the environment premised on the presence of the hard disk.

The above-mentioned usage patterns using the general-purpose computer device as a boot target device are basically realized by loading booting data required for boot via a booting interface essentially supported by firmware (or a BIOS (Basic Input/Output System) or the like) of the boot target device from an external device.

As a specific example, there generally exists a method of directly booting the general-purpose computer device corresponding to the boot target device from an external storage medium such as a CD-ROM or a DVD-ROM for use, as is represented by a live CD, or a diskless computer which performs network boot via a network interface.

In addition to the above-mentioned example, there also exists a method of using an extended bootloader for allowing the booting data to be loaded even via an interface which is not directly supported by the firmware without requiring any change for the firmware.

For example, in the boot target device corresponding to the general-purpose computer device including the firmware which does not support the direct boot from a USB (Universal Serial Bus) interface nor a network interface but supports the direct boot from the CD-ROM or the floppy disk, there exists a method of storing a program operating as an extended bootloader to enable the boot from the USB interface or from the network in the CD-ROM or the floppy disk medium to first load the extended bootloader upon the boot of the boot target device and then to load the booting data required for the boot from the indirectly extended USB interface or network interface.

On the other hand, various improvements have also been made on a booting process used for booting the general-purpose computer device according to a specific purpose of use or condition.

In particular, due to the advantage in terms of cost, there are a large number of examples, in which the improvement of convenience is sought not by the improvement of hardware but by the improvement of software.

There are various specific contents of improvement. For example, various methods such as a method of effectively managing the booting data used in the boot target device without depending on the booting interface, a method of booting the boot target device at higher speed under a specific environment, and a method of making a waiting time for booting up the system unnoticeable to a user have been proposed.

Problems in the above-mentioned techniques will now be described.

In the existing techniques, once the transfer of the booting data used by the boot target device is started through a specific interface (including an interface extended by the extending bootloader), it is premised that the transfer of all the pieces of booting data is completed only via the fixed interface.

Even in this method, when the speed of the interface used for the transfer is sufficiently high and the amount of data to be transferred is relatively small, the waiting time does not appear as lowered convenience for the user because the waiting time for the completion of the transfer of the booting data to enable the boot target device is short.

However, in the general-purpose computer device or the like, which serves as the boot target device and uses a USB 1.1 interface, a time required to complete transfer of booting data may be extremely long (e.g., in the range of several tens of minutes to one hour or more), because the USB 1.1 interface has a relatively slow transfer speed. Of course, large amounts of booting data increase the transfer time, which may be the case for a large-scale general-purpose computer operating system and for software applications running on the operating system and the like.

This fact brings about a situation in which the above-mentioned usage pattern is not practical in view of the waiting time for the user, in view of the computer resources of the boot source device occupied for booting the boot target device, and in view of the portability of the booting system.

Besides, in the case where the boot target device is to be booted from the external storage device, the storage device remains connected to the USB interface to protrude from the boot target device until the transfer is completed once the transfer of the booting data is started from the storage device via the USB interface, in the existing techniques described in the background art. As a result, there is a possibility that the portability of the boot target device being booted is impaired. This may be the case when the storage device has a plurality of interfaces operating as an SD (Secure Digital) memory card and also as the USB memory card is used as the external storage device, and a portable general-purpose computer device has both an externally exposed USB port and a memory card slot which can hold the SD card therein as the interfaces, which supports the direct boot from the USB interface but not the direct boot from the SD memory card slot as firmware, is used as the boot target device.

The above description is similarly applied to the case where a general SD memory card is used via a USB style SD card reader adapter to be operated as the USB memory card in terms of the reduced portability of the boot target device being booted.

For solving the problems as described above, the boot source device having higher-speed hardware can be used to improve the waiting time for the user, and further, devising an external shape of the boot target device can improve the portability of the boot target device being booted currently. However, such solutions which involve a hardware modification generally brings about an increase in device cost.

Moreover, although it is possible to modify the firmware used in the boot target device to a special one according to the characteristics of a specific boot source device or storage device, such a solution impairs the characteristics of the boot target device corresponding to the general-purpose computer and also leads to an increase in development cost for the development of specific individual firmware.

A device booting system described below is configured to solve the above-mentioned problems.

SUMMARY

The present invention is devised in view of the above-mentioned background, and has an object of providing a booting system, a boot program and a method therefor. The present invention relates, in particular, to a usage pattern in which a boot target device operating as a general-purpose computer device is booted by a boot source device corresponding to an external device or an external storage device for use.

In order to achieve the above-mentioned object, according to the present invention, there is provided a booting system including a boot target device and a boot source device having a first object and a second object for booting the boot target device, the boot target device and the boot source device being connectable by using at least one interface, the first object and the second object being transferred via boot object transfer paths using at least one of the at least one interface. The booting system includes: a first transfer module for transferring the first object from the boot source device via a first boot object transfer path using a first interface to the boot target device; an interface enabling module for causing the boot target device to boot the first object to make at least one interface functional; a transfer path switching module for switching a transfer path to enable at least one boot object transfer path using the interface that has been made functional; a second transfer module for transferring the second object from the boot source device via the at least one boot object transfer path to the boot target device; and an object boot up module for causing the boot target device to boot the second object.

Preferably, the second transfer module transfers the second object from the boot source device to the boot target device in a parallel distributed manner via each of at least two boot object transfer paths.

Preferably, the boot target device includes: an object transfer module for transferring the second object; and a transfer continuation module for allowing transfer of the second object to be continued via the boot object transfer path switched by the transfer path switching module when the at least one object transfer path is switched after start of the transfer of the second object.

Preferably, the boot source device includes a dynamical object modification module for dynamically modifying the first object and the second object according to the boot target device or the boot object transfer path.

Preferably, the booting system further includes: a safety detection module for detecting safety of the boot object transfer path; an encryption key exchanging module for causing the boot source device and the boot target device to exchange a key used for encryption via the boot object transfer path having a degree of safety higher than a predetermined value when the degree of safety of the boot object transfer path is lower than the predetermined value; and an encrypted transfer path establishing module for establishing the boot object transfer path having the degree of safety lower than the predetermined value as an encrypted boot object transfer path.

Preferably, the booting system further includes: a transfer speed monitoring module for monitoring a transfer speed of the second object by the second transfer module; and a transfer path searching module for searching for the boot object transfer path having the transfer speed of the second object higher than the monitored transfer speed based on the monitored transfer speed. The transfer path switching module switches or adds the transfer path to enable the searched boot object transfer path.

Further, according to the present invention, there is provided a booting system including a boot target device and a storage device storing a first object and a second object for booting the boot target device, the boot target device and the storage device being connectable by using at least one interface, the first object and the second object being transferred via boot object transfer paths using at least one of the at least one interface. The boot target device includes: a first object loading module for loading the first object transferred via a first boot object transfer path using a first interface from the storage device; an interface enabling module for booting the loaded first object to perform processing to make at least one interface functional; a transfer path switching module for switching the transfer path to enable at least one boot object transfer path using the interface that has been made functional; a second object loading module for loading the second object transferred from the storage device via a second boot object transfer path using any of the at least one functional interface; and an object boot up module for booting the second object.

Preferably, the boot target device further includes a transfer continuation module for allowing transfer of the second object to be continued via the boot object transfer path switched by the transfer path switching module when the at least one boot object transfer path is switched after start of the transfer of the second object.

Further, according to the present invention, there is provided a booting method for a booting system including a boot target device and a boot source device having a first object and a second object for booting the boot target device, the boot target device and the boot source device being connectable by using at least one interface, the first object and the second object being transferred via boot object transfer paths using at least one of the at least one interface. The booting method includes: a first transfer step of transferring the first object from the boot source device to the boot target device via a first boot object transfer path using a first interface; an interface enabling step of causing the boot target device to boot the first object to make at least one interface functional; a transfer path switching step of switching the transfer path to enable at least one boot object transfer path using the interface that has been made functional; a second transfer step of transferring the second object from the boot source device to the boot target device via the at least one boot object transfer path; and an object boot up step of causing the boot target device to boot the second object.

Further, according to the present invention, there is provided a booting method for a booting system including a boot target device and a storage device storing a first object and a second object for booting the boot target device, the boot target device and the storage device being connectable by using at least one interface, the first object and the second object being transferred via boot object transfer paths using at least one of the at least one interface. The booting method in the boot target device includes: a first object loading step of loading the first object transferred from the storage device via a first boot object transfer path using a first interface; an interface enabling step of booting the loaded first object to make the at least one interface functional; a transfer path switching step of switching the transfer path to enable at least one boot object transfer path using the interface that has been made functional; a second object loading step of loading the second object transferred via a second boot object transfer path using any of the at least one functional interface from the storage device; and an object boot up step of booting the second object.

Further, according to the present invention, there is provided a boot program for a booting system including a boot target device corresponding to a computer and a boot source device corresponding to a computer including a first object and a second object for booting the boot target device, the boot target device and the boot source device being connectable by using at least one interface, the first object and the second object being transferred via boot object transfer paths using at least one of the at least one interface. The boot program causes the boot target device or the boot source device to execute: a first transfer step of transferring the first object from the boot source device to the boot target device via a first boot object transfer path using a first interface; an interface enabling step of causing the boot target device to boot the first object to make at least one interface functional; a transfer path switching step of switching the transfer path to enable at least one boot object transfer path using the interface that has been made functional; a second transfer step of transferring the second object from the boot source device to the boot target device via the at least one boot object transfer path; and an object boot up step of causing the boot target device to boot the second object.

Further, according to the present invention, there is provided a boot program for a booting system including a boot target device corresponding to a computer and a storage device storing a first object and a second object for booting the boot target device, the boot target device and the storage device being connectable by using at least one interface, the first object and the second object being transferred via boot object transfer paths using at least one of the at least one interface. The boot program causes the boot target device to execute: a first object loading step of loading the first object transferred from the storage device via a first boot object transfer path using a first interface; an interface enabling step of booting the loaded first object to make the at least one interface functional; a transfer path switching step of switching the transfer path to enable at least one boot object transfer path using the interface that has been made functional; a second object loading step of loading the second object transferred via a second boot object transfer path using any of the at least one functional interface from the storage device; and an object boot up step of booting the second object.

According to the present invention, in order to cope with the above-mentioned problems to be solved by the invention, a highly convenient booting system, a boot program and a method therefor, which can be used in practice even in combination with a boot source device, a storage device, and a boot target device, which are designed at low cost or for a general use for the purpose of, in particular, mass production, can be provided.

BRIEF DESCRIPTION OF THE DRAWINGS

FIGS. 3A-B are views exemplifying an embodiment of a method of booting the boot target device by using the boot source device in the device booting system illustrated in FIG. 1.

FIGS. 7A-B are views exemplifying an embodiment of a method of booting the boot target device without using the boot source device.

DETAILED DESCRIPTION OF THE EMBODIMENTS OF THE PRESENT INVENTION

Hereinafter, embodiments of the present invention will be described.

Figure 1:
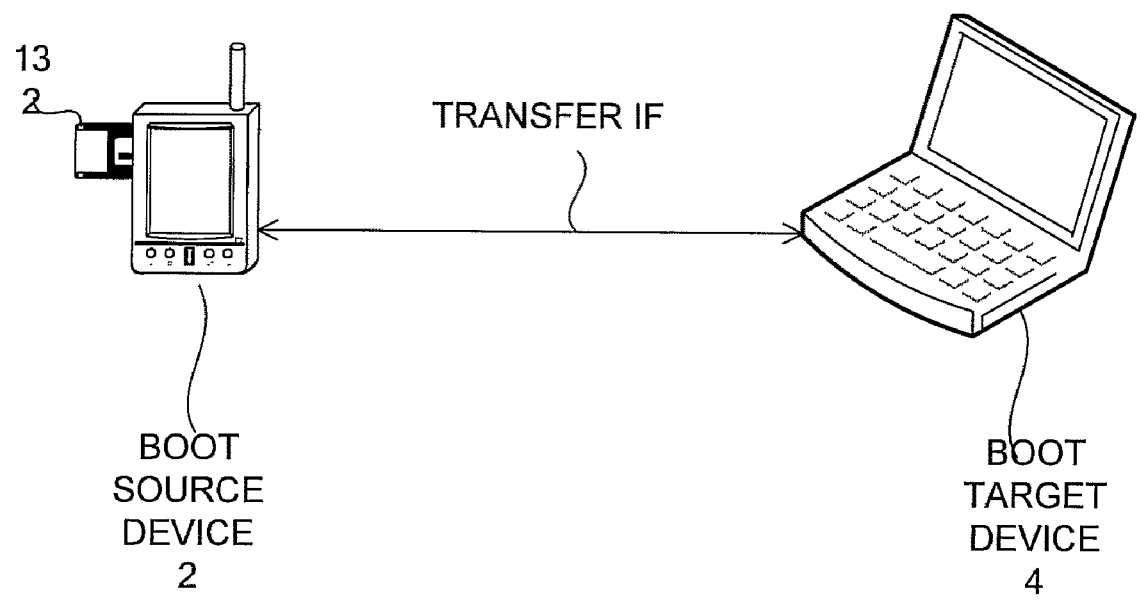
FIG. 1 is a view exemplifying a configuration of a device booting system according to an embodiment of the present invention.

FIG. 1 is a view exemplifying a configuration of a device booting system 1 according to an embodiment of the present invention.

As illustrated in FIG. 1, the device booting system 1 includes a boot source device 2 and a boot target device 4 which are connected to each other through a transfer interface (IF) for transferring data.

The boot source device 2 is a portable information terminal such as, for example, a PDA, a smartphone, a cellular phone, a portable media player or a small PC (Personal Computer). As described below referring to FIG. 3, the boot source device 2 stores data required for booting the boot target device 4 (booting data), and transfers the booting data to the boot target device 4.

It should be noted that the booting data may be stored not in the boot source device 2 but in an external storage medium 132.

The boot target device 4 is, for example, a PC, and uses the booting data from the boot source device 2 to perform its own boot processing.

The transfer interface may be any interface, for example, a general-purpose bus such as a USB, an IEEE1394, an eSATA (External Serial Advanced Technology Attachment), a wired LAN (Local Area Network) such as the Ethernet (registered trademark), a wireless LAN such as a WiFi (Wireless Fidelity), a wireless communication such as the Bluetooth, and an infrared communication such as an IrDA (Infrared Data Association).

It should be noted that the transfer interface may include adapter equipment such as a USB hub, a LAN switch or a memory card reader.

Some transfer interfaces can realize a plurality of logical connection methods.

For example, on the USB interface, one or a plurality of individual logical devices such as a USB_CD-ROM device and a USB_hard disk device may simultaneously be emulated.

Herein, the USB_CD-ROM device indicates that the USB is used as a physical connection method and the CD-ROM device is used as a logical connection method. The same is applied to the specification of the present application below.

It should be noted that, in this application, the term "transfer interface" denotes a transfer path of a boot object used for the data transfer. When the transfer interface is referred to as a "boot object transfer path", the meaning encompasses a path based on a physical method or a logical method being executed on the transfer interface.

The path based on the physical method means a physical path constituting the interface, for example, a connection path by the USB interface including the USB hub.

Further, the path based on the logical method means a connection path even with a difference in logical method, such as a USB_CD-ROM device emulation method at the USB interface. When the logical methods are different on the same physical path, the transfer paths are different "boot object transfer paths".

For example, in the USB_CD-ROM device emulation method on the USB interface and the USB_hard disk device emulation method on the USB interface, the "boot object transfer paths" are different.

It should be noted that, in each of the following drawings, substantially the same components and processing are denoted by the same reference numerals.

Also, hereinafter, a device, which can be a main subject of information processing and a communication, such as the boot source device 2 in the device booting system 1 is sometimes collectively referred to as a node.

Further, in each of the following drawings, a component which is not necessary for the description of the present invention is appropriately omitted for the concretization and clarification of the illustration.

Hardware

Figure 2:
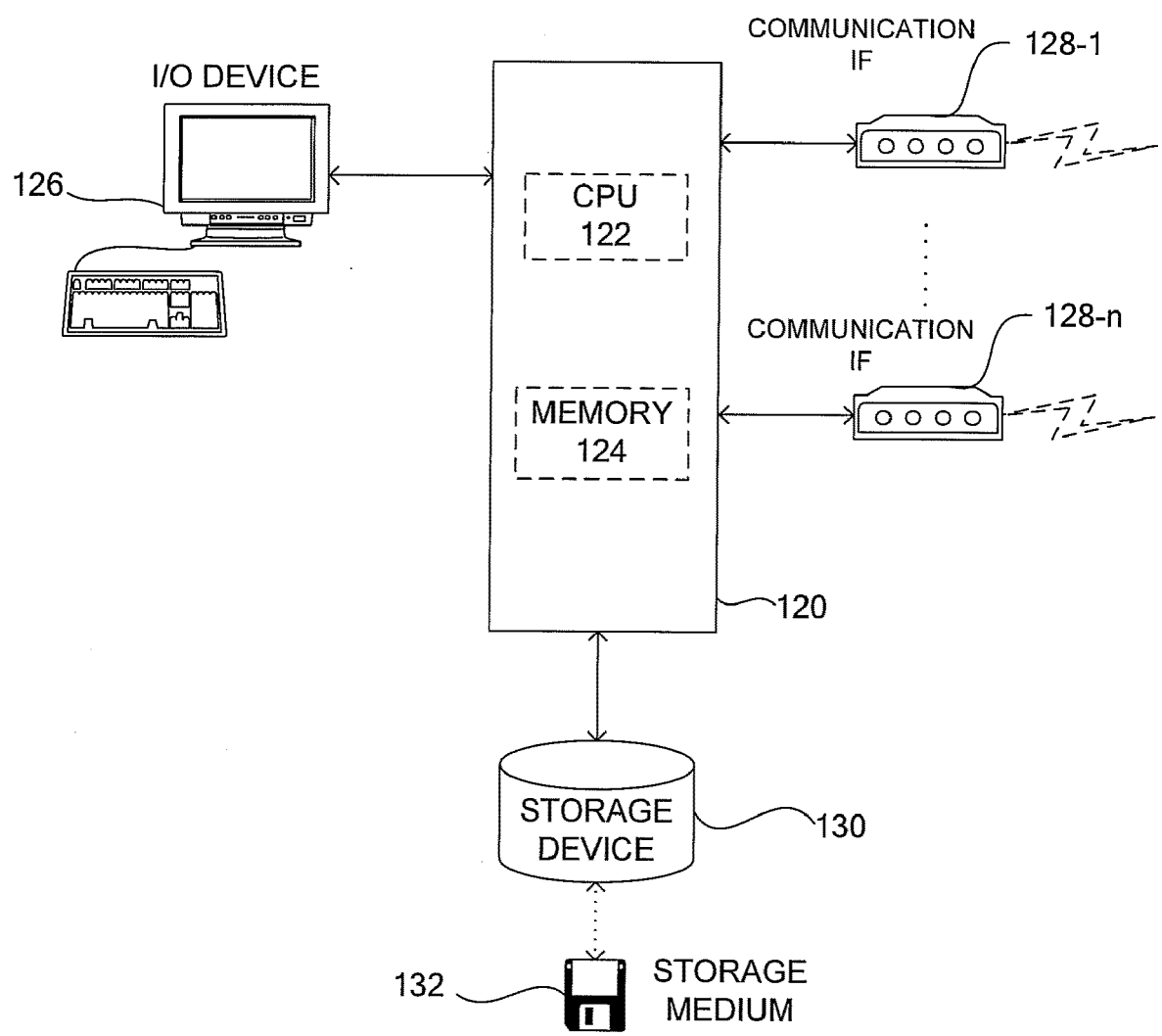
FIG. 2 is a view exemplifying hardware configurations of a boot source device and a boot target device illustrated in FIG. 1 according to an embodiment of the present invention.

FIG. 2 is a view exemplifying hardware configurations of the boot source device 2 and the boot target device 4 illustrated in FIG. 1.

As illustrated in FIG. 2, each of the boot source device 2 and the boot target device 4 includes a main body 120 including a CPU 122, a memory 124 and the like, an I/O device 126 including a keyboard, a display device and the like, communication interfaces 128-1 to 128-n for communication with another node (n is an integer equal to or larger than 1; however, n is not always the same number), and a storage device 130 for recording and reproducing data on/from a storage medium 132, such as a CD device and an HDD device. Specifically, each of the boot source device 2 and the boot target device 4 has a hardware configuration as a computer capable of performing information processing and communicating with another node.

It should be noted that, hereinafter, in a case of indicating a plurality of components such as the communication interfaces 128-1 to 128-n without differentiating, those components are simply denoted as the communication interface 128 in some cases.

Outline of this Embodiment

FIGS. 3A-B are views exemplifying an embodiment of a method of booting the boot target device 4 by using the boot source device 2 in the device booting system 1 illustrated in FIG. 1. As illustrated in FIG. 3(A), the boot source device 2 and the boot target device 4 are connected to each other through a transfer interface #1. The transfer interface #1 is an interface supported by firmware or a BIOS of the boot target device 4, and is, for example, a USB.

It should be noted that, in this application, the expression "supported by the BIOS" or "boot is supported by the BIOS" may include the interface extended by the extended bootloader described as the existing technique.

The boot source device 2 transfers a first object to the boot target device 4 via the transfer interface #1. The first object corresponds to booting data which enables the boot target device 4 to use the interfaces including an interface other than the transfer interface #1, which is not supported by the BIOS.

After the boot target device 4 is enabled to use the interface other than the transfer interface #1, the transfer source device 2 transfers a second object corresponding to booting data for booting the OS of the boot target device 4 and the like via, for example, transfer interfaces #1, #2 and #3, as illustrated in FIG. 3(B).

Each of the transfer interfaces #2 and #3 is, for example, a wireless LAN such as the WiFi or an infrared communication or the like such as the IrDA.

The BIOS of the boot target device 4 does not support the direct boot from the above-mentioned interfaces. By using the above-mentioned interfaces with the transfer interface #1, however, a data transfer speed can be increased in many cases as compared with the case where only the transfer interface #1 is used.

The boot source device 2 can transfer the booting data through the plurality of interfaces such as the transfer interfaces #1, #2 and #3 in parallel to the boot target device 4.

Figure 4:
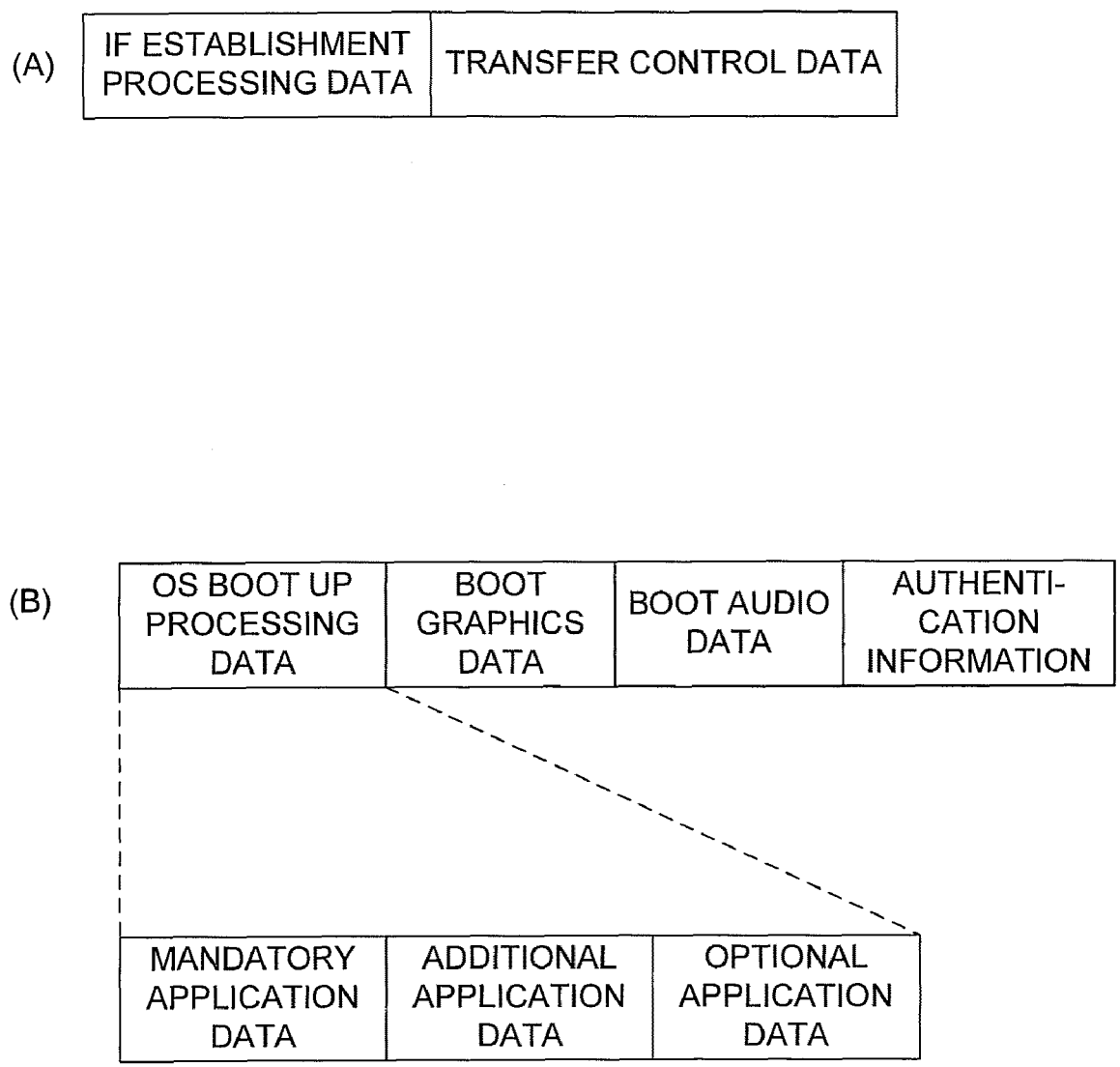
FIGS. 4A-B are views illustrating booting data which is transferred from the boot source device to the boot target device according to an embodiment of the present invention.

FIGS. 4A-B are views illustrating the booting data which is transferred from the boot source device 2 to the boot target device 4. FIG. 4(A) illustrates the booting data contained in the first object transferred in a state illustrated in FIG. 3(A), and FIG. 4(B) illustrates the booting data contained in the second object transferred in a state illustrated in FIG. 3(B).

As illustrated in FIG. 4(A), the booting data transferred in the state illustrated in FIG. 3(A) contains interface establishment processing data used by the boot target device 4 to establish the interface, and transfer control data for transferring the data via the thus established interface.

Figure 5:
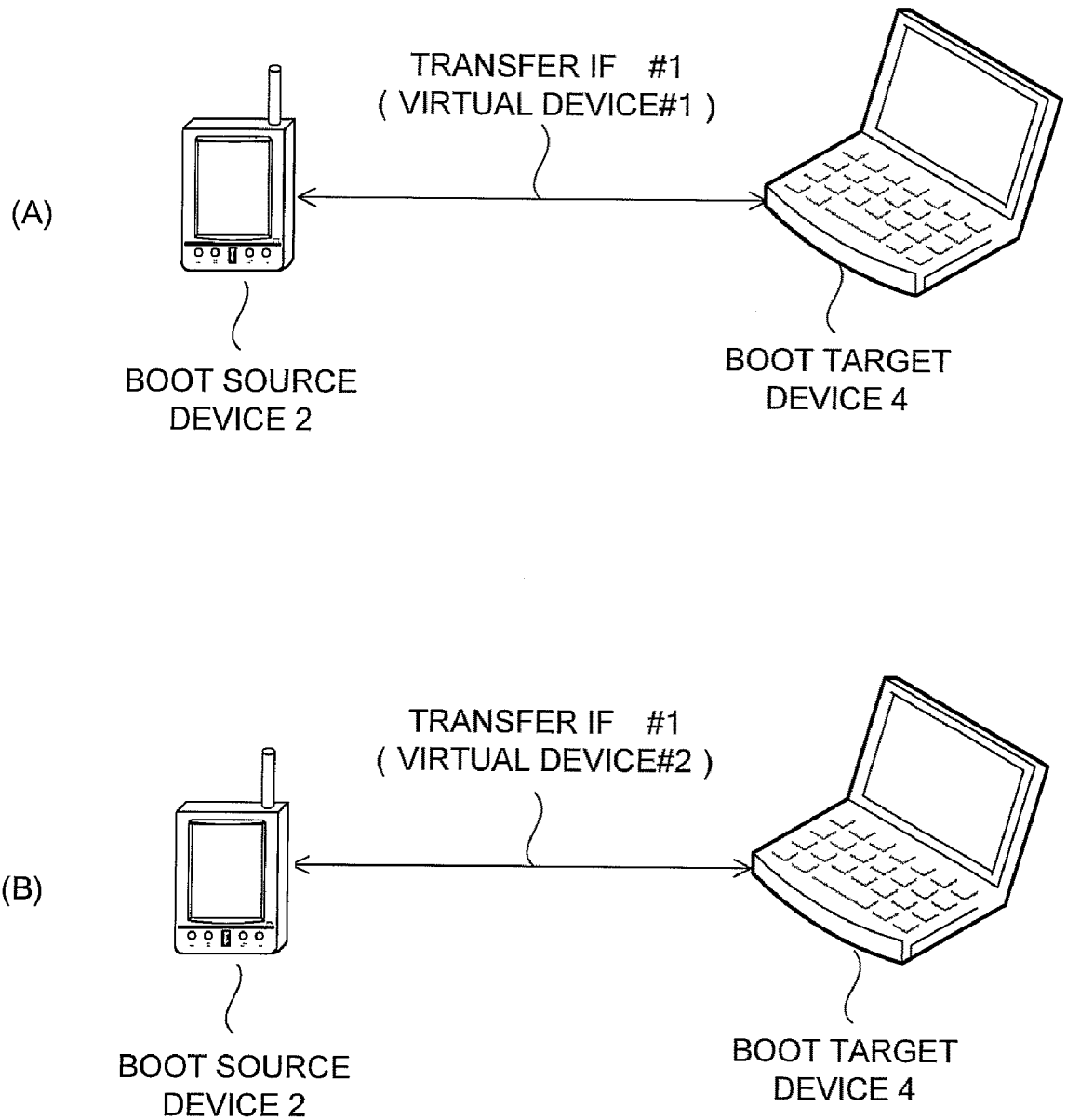
FIGS. 5A-B are views exemplifying an embodiment of a method of booting the boot target device by using the boot source device in the device booting system illustrated in FIG. 1.

It should be noted that the interface establishment processing data contains data used by the boot target device 4 to establish a link with a device which is emulated by the interface as in an embodiment described below referring to FIG. 5.

As illustrated in FIG. 4(B), the booting data transferred in the state illustrated in FIG. 3(B) contains OS boot up processing data, boot graphics data, boot audio data, and authentication information.

The OS boot up processing data contains mandatory application data, additional application data, and optional application data.

Herein, the boot graphics data is data related to graphics displayed on the I/O device 126, for example, such as a monitor while the boot target device 4 is executing OS boot up processing.

The boot audio data is data related to a sound emitted from the I/O device 126, for example, such as a speaker while the boot target device 4 is executing the OS boot up processing.

The authentication information is information for authenticating a user who uses the boot target device 4 or the like, and includes, for example, data for encryption or biometric information such as a fingerprint.

The mandatory application data is data related to an application which is mandatory for booting up the OS, and includes, for example, a kernel and the like.

The additional application data is data related to an application which is actually used by the user on the booted OS, and includes, for example, office software and the like.

The optional application data is data related to an application which is loaded as needed, and includes, for example, game software and the like.

FIGS. 5A-B are views exemplifying an embodiment of the method of booting the boot target device 4 by using the boot source device 2 in the device booting system 1 illustrated in FIG. 1.

As illustrated in FIG. 5(A), the boot source device 2 and the boot target device 4 are connected to each other via the transfer interface #1. The transfer interface #1 is, for example, the USB or the like as in FIGS. 3A-B, and further emulates one virtual device #1 in a logical method. Herein, the virtual device #1 is a device supported by the BIOS of the boot target device 4, and is, for example, the CD-ROM device or the like. It should be noted that, in this embodiment, an interface which emulates the virtual device and an interface which does not emulate the virtual device are sometimes treated as different interfaces.

The boot source device 2 transfers the first object via the transfer interface #1 to the boot target device 4. The first object corresponds to the booting data (illustrated in FIG. 4(A)) for allowing the boot target device 4 to establish a link including a device which is not supported by the BIOS other than the virtual device #1 emulated by the transfer interface #1 and to use the device.

After the boot target device 4 is enabled to use the device other than the virtual device #1, the boot source device 2 transfers the second object to the boot target device 4 via the transfer interface #1 which emulates, for example, a virtual device #2, as illustrated in FIG. 5(B). The second object corresponds to the booting data (illustrated in FIG. 4(B)) for booting up the OS of the boot target device 4.

Herein, the virtual device #2 includes, for example, an expansion card such as a NIC (Network Interface Card), a hard disk drive and the like.

The BIOS of the boot target device 4 does not directly support the boot from the above-mentioned devices in many cases. Even if the BIOS supports the boot, the boot is not sufficiently tested. As a result, in many cases, only the boot from a specific device is realized.

FIGS. 6A-B are views exemplifying an embodiment of the method of booting the boot target device 4 by using the boot source device 2 in the device booting system 1 illustrated in FIG. 1.

As illustrated in FIG. 6(A), the boot source device 2 and the boot target device 4 are connected to each other through the transfer interface #1. The transfer interface #1 is, for example, the USB or the like as in the case of FIG. 3 or the like. The storage medium 132 is, for example, the SD (Secure Digital) memory card or the like, and stores the booting data for the boot target device 4 and is inserted into the boot source device 2.

The storage medium 132 is not supported for the direct boot from the BIOS of the boot target device 4 in many cases. The boot source device 2 transfers the first object to the boot target device 4 via the transfer interface #1. The first object corresponds to the booting data for allowing the boot target device 4 to establish the interfaces including the interface other than the transfer interface #1, which is not supported by the BIOS, and to use the interface.

After the boot target device 4 is enabled to use the interface other than the transfer interface #1, the storage medium 132 is inserted into the boot target device 4 as illustrated in FIG. 6(B). As a result, the boot target device 4 can read the second object corresponding to the booting data for booting up the OS of the boot target device 4 from the storage medium 132.

FIGS. 7A-B are views exemplifying an embodiment of a method of booting the boot target device 4 without using the boot source device 2.

As illustrated in FIG. 7(A), the storage medium 132 and the boot target device 4 are connected to each other via the transfer interface #1. The transfer interface #1 is, for example, the USB as in the case of FIG. 3 or the like. More specifically, a memory card reader for reading the SD card as a USB memory is connected, or a storage device having two different interfaces, i.e., an SD card interface and a USB memory card interface, is connected through the USB interface.

The boot target device 4 reads the first object from the storage medium 132 via the transfer interface #1. The first object corresponds to the booting data for establishing the interfaces including the interface whose direct boot is not supported by the BIOS other than the transfer interface #1 and for enabling the use of the interface.

After the boot target device 4 is enabled to use the interface other than the transfer interface #1, the storage medium 132 is inserted into the boot target device 4 as illustrated in FIG. 7(B). As a result, the boot target device 4 can read the second object corresponding to the booting data for booting up the OS of the boot target device 4 or the like from the storage medium 132.

Boot Source Device Program 20

Figure 8:
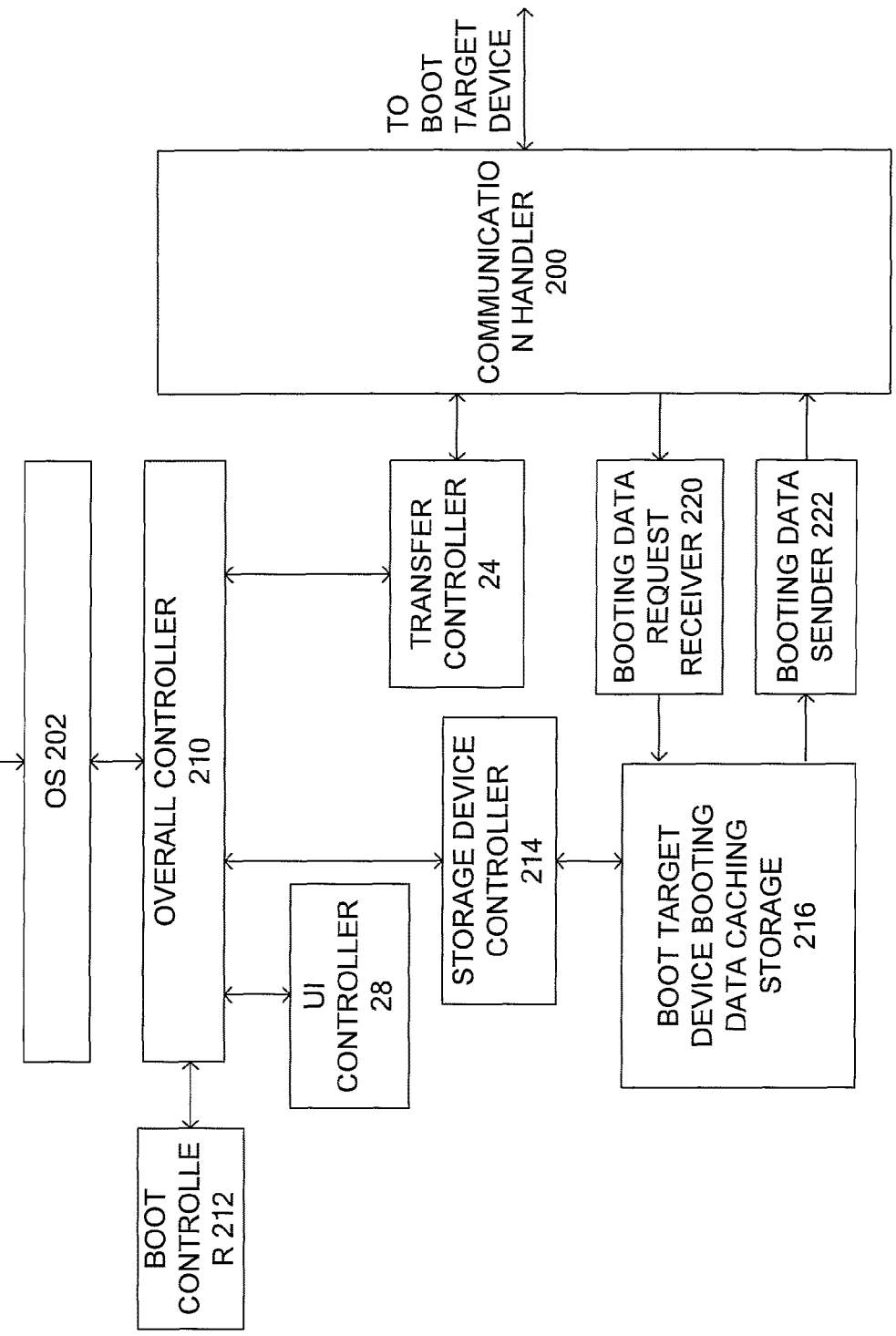
FIG. 8 is a view illustrating a configuration of a boot source device program operating on the boot source device illustrated in FIG. 1 according to an embodiment of the present invention.

FIG. 8 is a view illustrating a configuration of a boot source device program 20 operating on the boot source device 2 illustrated in FIG. 1.

As illustrated in FIG. 8, the boot source device program 20 includes a communication handler 200, an OS 202, an overall controller 210, a boot controller 212, a storage device controller 214, a boot target device booting data caching storage 216, a booting data request receiver 220, a booting data sender 222, a transfer controller 24, and a user interface (UI) controller 28.

In the boot source device program 20, the communication handler 200 performs processing necessary for communicating with the boot target device 4 via the transfer interface. The overall controller 210 controls each of the components of the boot source device program 20. Specifically, the overall controller 210 outputs a signal necessary for processing in each component of the boot source device program 20 and further receives a signal from each component to perform necessary processing.

The boot controller 212 performs control for starting each component of the boot source device program 20 and other applications. The storage device controller 214 performs control for reading and writing data from/to the storage device 130 included in the boot source device 2 and the external storage medium 132 such as the SD memory card.

The storage device controller 214 outputs a signal (request signal) for requesting the booting data for the boot target device 4 from the boot storage device 130 or the storage medium 132 to the overall controller 210 The overall controller 210 also outputs the request signal for the booting data, which is received from the storage device controller 214, to the OS 202. The overall controller 210 receives the booting data, which is output from the storage device 130 or the storage medium 132 in response to the request signal for the booting data, from the OS 202, and outputs the received booting data to the storage device controller 214. The storage device controller 214 outputs the booting data received from the overall controller 210 to the boot target device booting data caching storage 216.

The boot target device booting data caching storage 216 caches and manages the booting data received from the storage device controller 214. The boot target device booting data caching storage 216 also outputs the booting data to the booting data sender 222 described below, as needed.

It should be noted that the boot target device booting data caching storage 216 is capable of caching a plurality of types of booting data according to the application in the boot target device 4. Instead of caching the entire booting data at a time, the boot target device booting data caching storage 216 can operate to cache partial data over a plurality of times and then to release the cached partial data.

The booting data request receiver 220 receives a signal for requesting the booting data (booting data request signal) for the boot target device 4 from the boot target device 4, and outputs the received signal to the boot target device booting data caching storage 216.

Upon reception of the booting data request signal from the booting data request receiver 220, the boot target device booting data caching storage 216 outputs the booting data corresponding to the boot target device 4, which has sent the booting data request signal, to the booting data sender 222.

The booting data sender 222 sends the booting data from the boot target device booting data caching storage 216 to the boot target device 4 via the communication handler 200 and the transfer interface.

Figure 9:
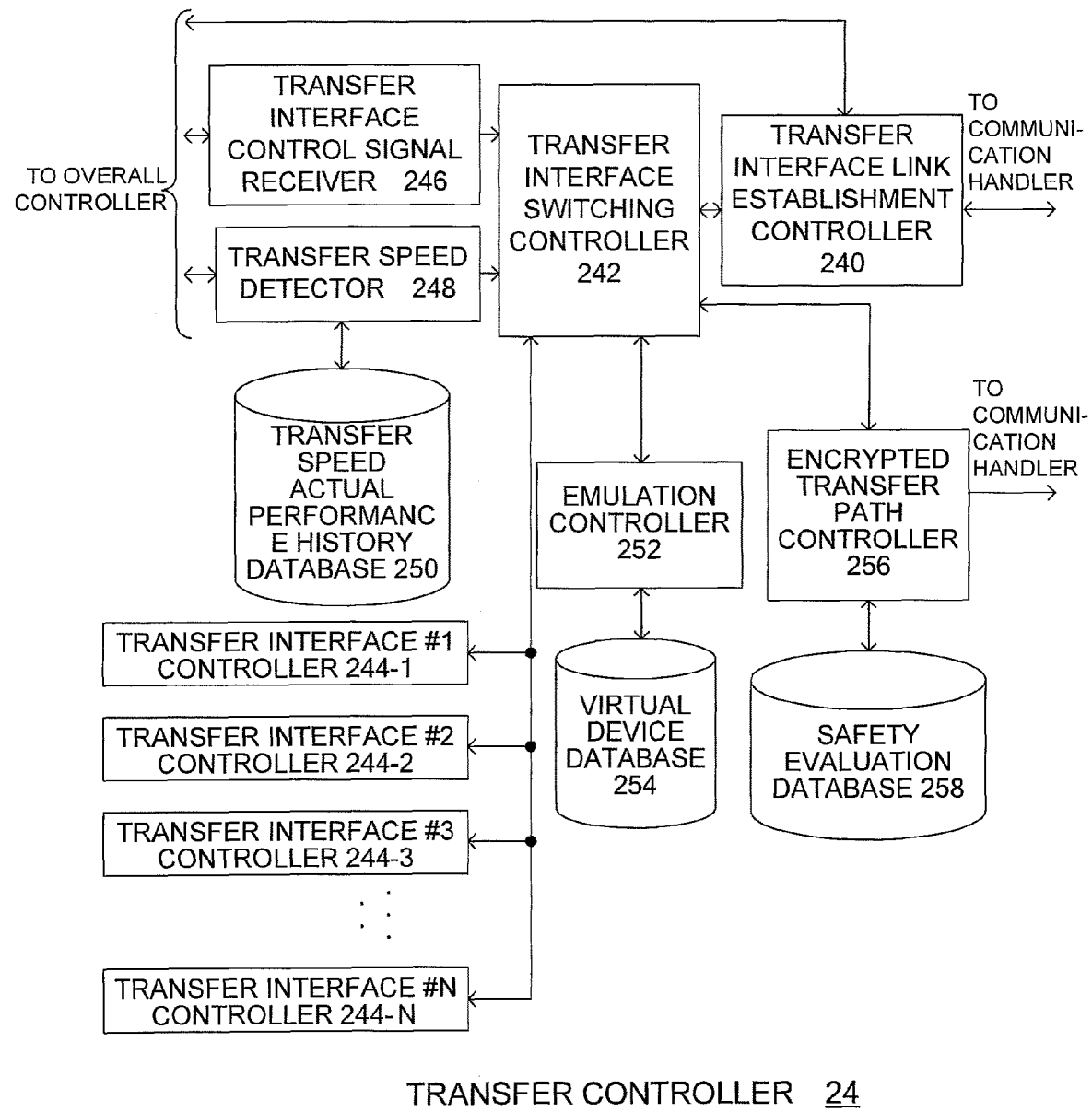
FIG. 9 is a view illustrating a configuration of a transfer controller illustrated in FIG. 8 according to an embodiment of the present invention.

FIG. 9 is a view illustrating a configuration of the transfer controller 24 illustrated in FIG. 8.

As illustrated in FIG. 9, the transfer controller 24 includes a transfer interface link establishment controller 240, a transfer interface switching controller 242, a transfer interface #1 controller 244-1, a transfer interface #2 controller 244-2, a transfer interface #3 controller 244-3, a transfer interface #N controller 244-N (N is an integer equal to or larger than 1; however, all the N's are not always the same number), a transfer interface control signal receiver 246, a transfer speed detector 248, a transfer speed actual performance history database (DB) 250, an emulation controller 252, a virtual device database 254, an encrypted transfer path controller 256, and a safety evaluation database 258.

When the transfer interface #1 controller 244-1, the transfer interface #2 controller 244-2, the transfer interface #3 controller 244-3, the transfer interface #N controller 244-N are described without differentiating, those components are simply denoted as the transfer interface controller 244 in some cases.

With the above-mentioned components, the transfer controller 24 performs processing of establishing the interface between the boot source device 2 and the boot target device 4 to control the transfer of the data via the transfer interface.

The transfer controller 24 also performs processing of switching the interface between the boot source device 2 and the boot target device 4. In the transfer controller 24, the transfer interface link establishment controller 240 performs processing of establishing a link of the interface between the transfer source device 2 and the transfer target device 4 according to the control of the overall controller 210.

The transfer interface link establishment controller 240 also performs processing of establishing the link of the switched interface according to the control signal from the transfer interface switching controller 242. Further, the transfer interface link establishment controller 240 outputs information of the interface being used to the overall controller 210.

The transfer interface switching controller 242 selects the interface to be used for the transfer of the booting data based on a signal from the transfer speed detector 248 or a signal from the transfer interface control signal receiver 246. The number of the interfaces selected by the transfer interface switching controller 242 is not limited to one and may be plural.

The transfer interface control signal receiver 246 receives a signal sent from an operation signal controller 300 described below referring to FIG. 10 from the overall controller 210, and outputs the received signal to the transfer interface switching controller 242.

The transfer speed detector 248 acquires information about the data transfer speed (data transfer speed information) via the overall controller 210, and stores the acquired data transfer speed information in the transfer speed actual performance history database 250. The transfer speed detector 248 also judges based on the acquired data transfer speed information whether or not the current data transfer speed is higher than a predetermined speed. When the data transfer speed is lower than the predetermined speed, the transfer speed detector 248 determines the interface to be connected based on the data transfer speed information in the transfer speed actual performance history database 250. As a result, the boot object transfer path which can transfer the data at the highest speed can be determined to allow the optimization of the data transfer speed. Further, the transfer speed detector 248 outputs a signal indicating the determined interface to the transfer interface switching controller 242.

The transfer interface switching controller 242 makes a request for a signal for switching control to the transfer interface controller 244 or the emulation controller 252 according to the selected interface. Specifically, when the selected interface is the transfer interface #i (i is an integer equal to or larger than 1 and equal to or smaller than N; however, all the i's are not always the same number), the transfer interface switching controller 242 makes a request for the signal for enabling the use of the transfer interface #i to the transfer interface #i controller 244-*i*. Further, when the transfer interface #i is selected to emulate another virtual device, the transfer interface switching controller 242 makes a request for a signal for emulating the selected virtual device to the emulation controller 252.

The transfer interface #i controller 244-*i* controls the data transfer processing via the transfer interface #i. Further, the transfer interface #i controller 244-*i* outputs a signal for enabling the transfer interface #i to the transfer interface switching controller 242 based on the request signal from the transfer interface switching controller 242.

The emulation controller 252 selects a virtual device to be emulated by the transfer interface from the virtual device database 254 based on the request signal from the transfer interface switching controller 242. The emulation controller 252 also outputs a signal for allowing the transfer interface to emulate the selected virtual device to the transfer interface switching controller 242. In the above-mentioned manner, the boot object transfer path for transferring the booting data is determined.

Further, the transfer interface switching controller 242 outputs information about the selected boot object transfer path (boot object transfer path information) to the encrypted transfer path controller 256.

The encrypted transfer path controller 256 makes a search to determine whether or not the boot object transfer path information from the transfer interface switching controller 242 is stored in the safety evaluation database 258.

The safety evaluation database 258 stores the boot object transfer path information and a degree of safety of the boot object transfer path in association with each other.

The encrypted transfer path controller 256 performs control for encryption processing described below when the boot object transfer path information is not stored in the safety evaluation database 258 and, even if the boot object transfer path information is stored, the degree of safety of the boot object transfer path is lower than a predetermined value.

Specifically, the encrypted transfer path controller 256 controls processing for allowing key information used for encryption (encryption key information) to be exchanged with the boot target device 4 via the boot object transfer path having the degree of safety higher than the predetermined value.

The encrypted transfer path controller 256 also controls processing for encrypting the booting data when the booting data is transferred via the boot object transfer path having the degree of safety lower than the predetermined value.

Further, the encrypted transfer path controller 256 outputs a signal for executing the above-mentioned processing to the transfer interface switching controller 242 and the communication handler 200.

The transfer interface switching controller 242 performs processing for establishing the boot object transfer path having the degree of safety higher than the predetermined value as a path for transferring the encryption key information.

The communication handler 200 performs processing for allowing the encryption key information to be exchanged with the boot target device 4 and processing for encrypting the booting data.

For example, with regard to the safety evaluation database 258, a degree of safety higher than the predetermined value can be defined for a highly reliable boot object transfer path whose connections are all wired.

Further, for example, when a wireless LAN interface having a degree of safety lower than the predetermined value is used as a new transfer interface, the encrypted transfer path controller 256 controls the encryption at the interface level, for example, in the case of the wireless LAN, the setting of an ESSID (Extended Service Set Identifier), an encryption method and the encryption key at the link level, or the dynamic modification of a data packet actually transferred via the wireless LAN into encrypted data on the sending side and the decryption of the data on the receiving side at the data level.

Figure 10:
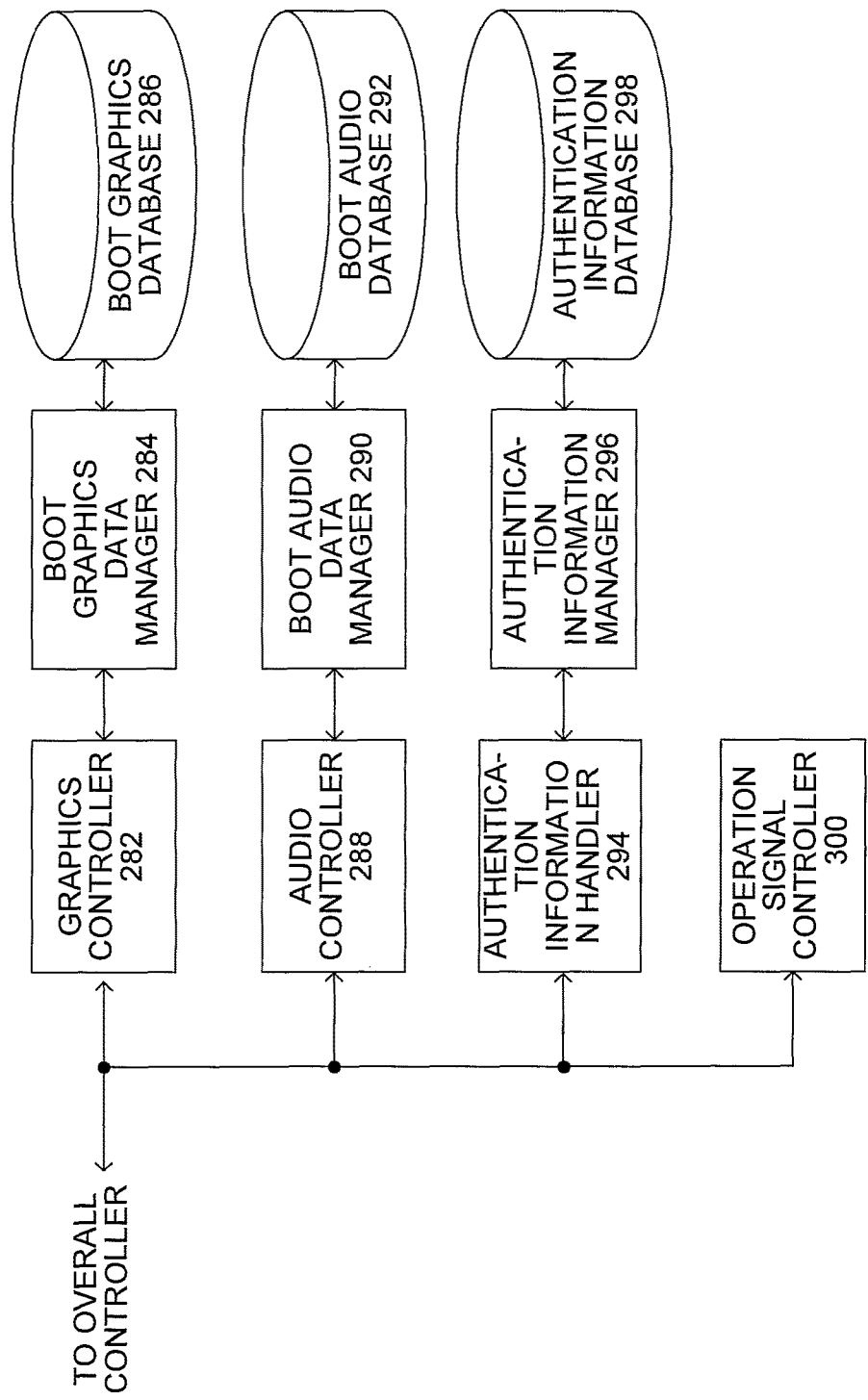
FIG. 10 is a view illustrating a configuration of a UI controller illustrated in FIG. 8 according to an embodiment of the present invention.

FIG. 10 is a view illustrating a configuration of the UI controller 28 illustrated in FIG. 8.

As illustrated in FIG. 10, the UI controller 28 includes a graphics controller 282, a boot graphics data manager 284, a boot graphics database 286, an audio controller 288, a boot audio data manager 290, a boot audio database 292, an authentication information controller 294, an authentication information manager 296, an authentication information database 298, and an operation signal controller 300.

With the above-mentioned components, the UI controller 28 performs processing for the interface with the user.

In the UI controller 28, the graphics controller 282 controls a graphic displayed on the I/O device 126 of the boot source device 2 such as a monitor while the boot source device 2 itself or the boot target device 4 is being booted.

The displayed graphics include, for example, an authentication graphic such as a password input graphic for user authentication, a guidance display graphic showing a boot processing procedure, a progression status display graphic showing a status of progression of the boot processing, an animation and the like.

The graphics controller 282 acquires data (graphics data) required for controlling the graphic displayed on the monitor or the like from the overall controller 210, and outputs the acquired data to the boot graphics data manager 284 as needed.

The boot graphics data manager 284 manages the graphics data from the graphics controller 282, and outputs the graphics data to the graphics controller 282 as needed.

The boot graphics data manager 284 also stores the graphics data received from the graphics controller 282 in the boot graphics database 286.

The audio controller 288 controls a sound emitted from the I/O device 126 of the boot source device 2 such as a speaker while the boot source device 2 itself or the boot target device 4 is being booted.

The emitted sound includes, for example, BGM, a guidance display sound indicating the boot processing procedure, and the like.

The audio controller 288 acquires data necessary for controlling the sound emitted from the speaker or the like (audio data) from the overall controller, and outputs the acquired data to the boot audio data manager 290 as needed.

The boot audio data manager 290 manages the audio data from the audio controller 288, and outputs the audio data to the audio controller 288 as needed. The boot audio data manager 290 also stores the audio data received from the audio controller 288 in the boot audio database 292.

The authentication information controller 294 controls processing for authenticating the user while the boot source device 2 itself or the boot target device 4 is being booted. Specifically, when the user inputs authentication information such as a password by using the I/O device 126 such as the keyboard according to the authentication graphic, the authentication information controller 294 acquires the authentication information from the overall controller 210.

Further, the authentication information controller 294 acquires the authentication information from the authentication information manager 296 to determine whether or not the authentication information from the user is correct.

If the authentication information from the user is correct, the authentication information controller 294 outputs a signal for allowing the continuation of the boot processing to the overall controller 210. If not, the authentication information controller 294 outputs a signal for interrupting the boot processing to the overall controller 210.

The authentication information manager 296 manages the authentication information of the user, which is stored in the authentication information database 298, and outputs the authentication information to the authentication information controller 294 as needed.

Herein, the authentication information includes, for example, not only the password input through the keyboard, but also biometric information such as a fingerprint input through a fingerprint input device (not shown) connected to the boot source device 2.

The operation signal controller 300 performs control for the boot processing according to an operation signal while the boot source device 2 itself or the boot target device 4 is being booted.

Specifically, when the user operates the I/O device 126 such as the keyboard according to the guidance display by the graphics controller 282 and the audio controller 288, the operation signal controller 300 acquires an operation signal according to the operation from the overall controller 210.

Further, the operation signal controller 300 judges the content of the operation signal, and outputs a signal for performing the boot processing according to the content to the overall controller 210.

Boot Target Device Program 40

Figure 11:
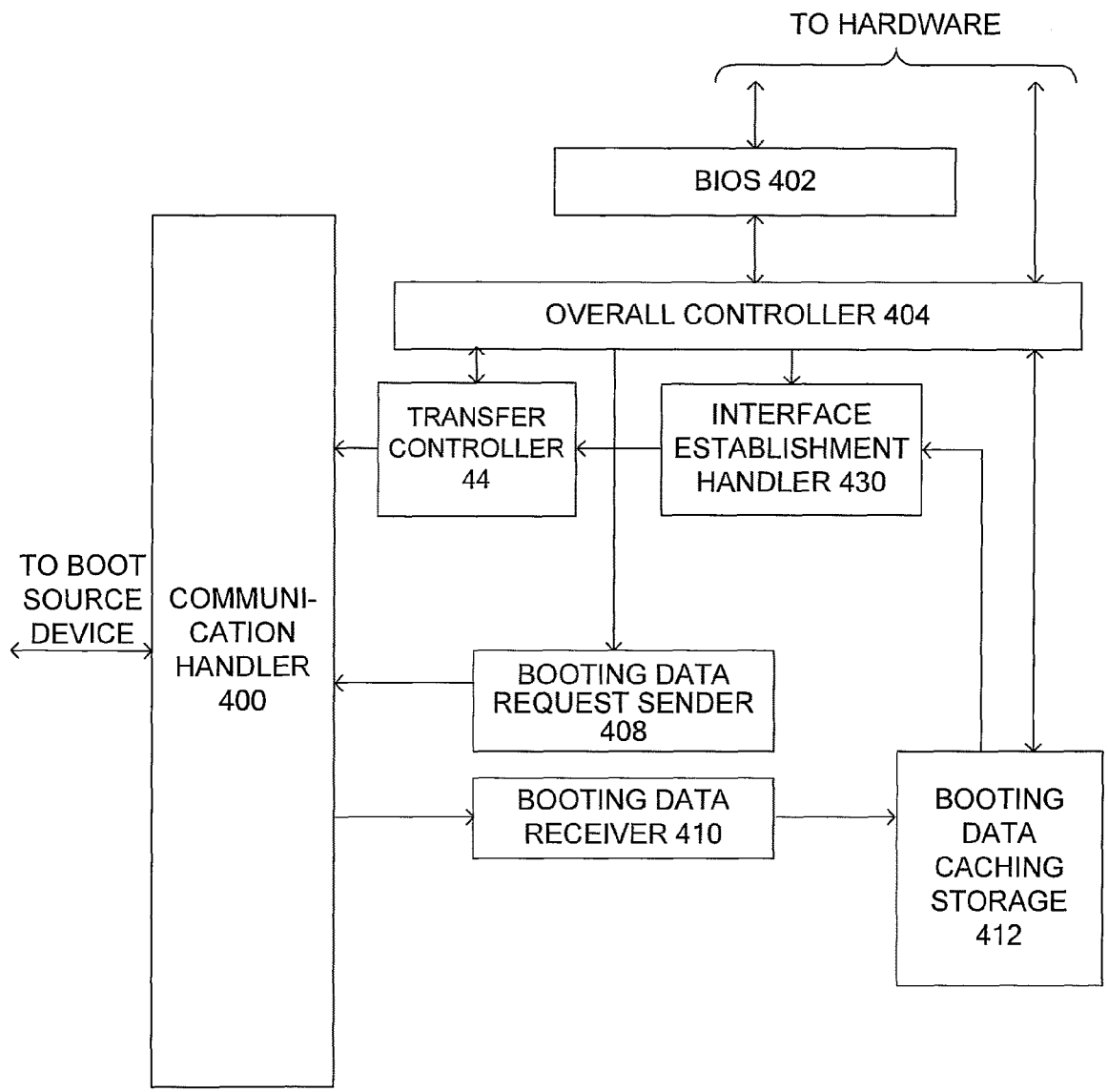
FIG. 11 is a view illustrating a configuration of a first stage of a boot target device program operating on the boot target device illustrated in FIG. 1 according to an embodiment of the present invention.

FIG. 11 is a view illustrating a configuration of a first stage of a boot target device program 40 operating on the boot target device 4 illustrated in FIG. 1.

As illustrated in FIG. 11, the boot target device program 40 in the first stage includes a communication handler 400, a BIOS 402, an overall controller 404, a booting data request sender 408, a booting data receiver 410, a booting data caching storage 412, an interface establishment handler 430, and a transfer controller 44.

With the above-mentioned components, the boot target device program 40 in the first stage establishes an interface based on interface establishment processing data in the first object loaded by the BIOS 402 to receive the second object such as the OS boot processing data illustrated in FIG. 4(B) from the boot source device 2.

In the boot target device program 40, the booting data caching storage 412 caches the interface establishment processing data and the transfer control data, which are contained in the first object loaded from the boot source device 2 by using the BIOS 402.

As described above referring to FIGS. 3(A), 5(A), 6(A), and 7(A), the first object is loaded by the BIOS 402 via the interface supported by the BIOS 402, but may be loaded via the interface extended by the extended bootloader.

The overall controller 404 requests the booting data caching storage 412 to output the interface establishment processing data and the transfer control data. The booting data caching storage 412 outputs the interface establishment processing data and the transfer control data in response to the request from the overall controller 404. The overall controller 404 performs processing of making the interface establishment handler 430 and the transfer controller 44 functional based on the received booting data. The interface establishment handler 430, which is now made functional, performs processing of establishing the interfaces including the interface which is not supported by the BIOS 402. Specifically, the interface establishment handler 430 outputs a signal for establishing the interfaces including the interface which is not supported by the BIOS 402 to the transfer controller 44.

Figure 12:
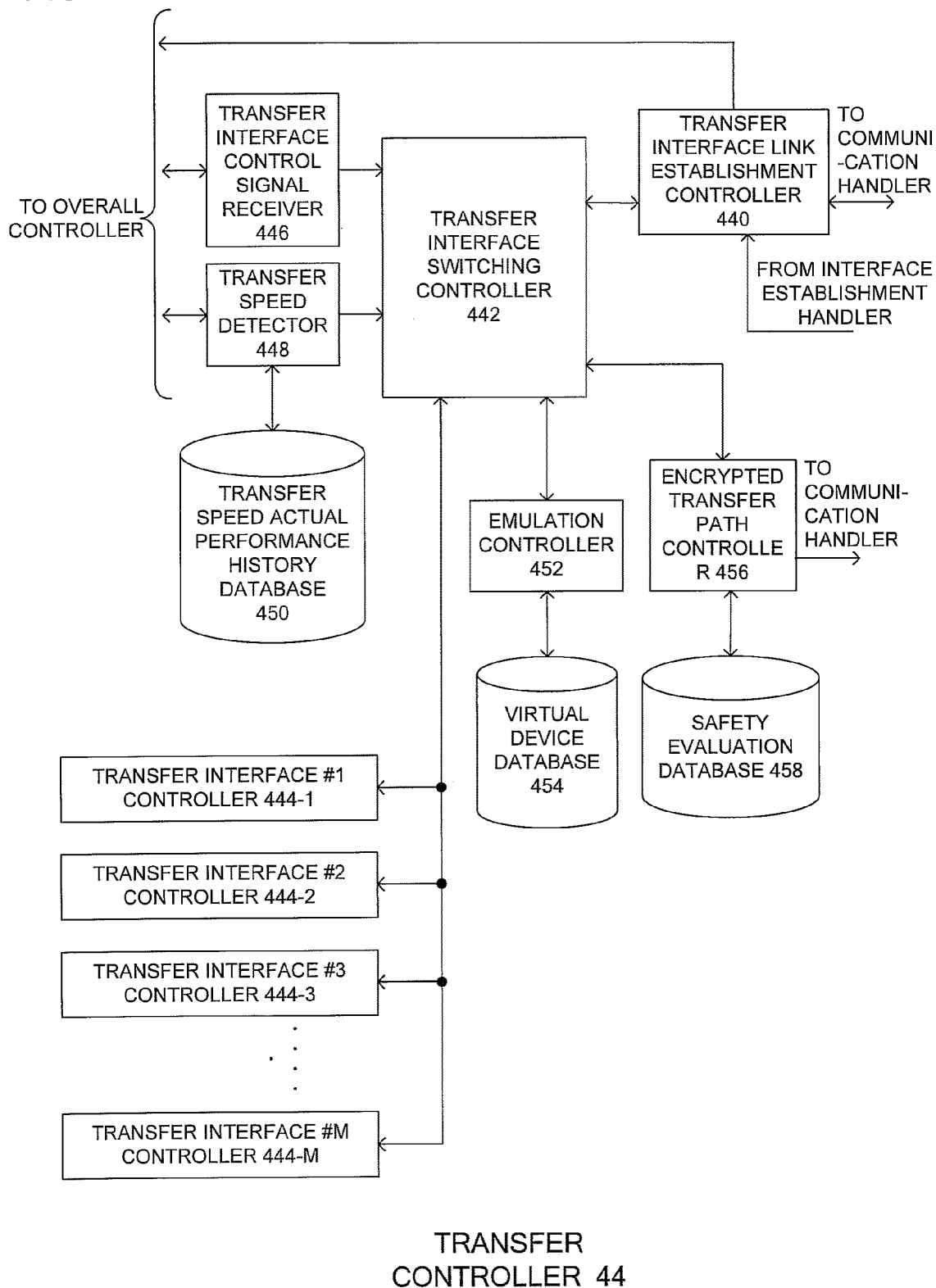
FIG. 12 is a view illustrating a configuration of a transfer controller illustrated in FIG. 11 according to an embodiment of the present invention.

FIG. 12 is a view illustrating a configuration of the transfer controller 44 illustrated in FIG. 11.

As illustrated in FIG. 12, the transfer controller 44 includes a transfer interface link establishment controller 440, a transfer interface switching controller 442, a transfer interface #1 controller 444-1, a transfer interface #2 controller 444-2, a transfer interface #3 controller 444-3, a transfer interface #M controller 444-M (M is an integer equal to or larger than 1; however, all the M's are not always the same number), a transfer interface control signal receiver 446, a transfer speed detector 448, a transfer speed actual performance history database 450, an emulation controller 452, a virtual device database 454, an encrypted transfer path controller 456, and a safety evaluation database 458.

With the above-mentioned components, the transfer controller 44 performs processing of establishing the interface between the boot source device 2 and the boot target device 4 to perform control for the data transfer via the transfer interface.

The transfer controller 44 also performs processing of switching the interface between the boot source device 2 and the boot target device 4.

In the transfer controller 44, the transfer interface link establishment controller 440 performs processing of establishing a link of the interface between the boot source device 2 and the boot target device 4 in response to a signal from the interface establishment handler 430.

The transfer interface link establishment controller 440 also performs processing of establishing a link of the switched interface according to a control signal from the transfer interface switching controller 442.

Further, the transfer interface link establishment controller 440 outputs information of the used interface to the overall controller 404.

The transfer interface switching controller 442 selects the interface to be used for the transfer of the booting data based on a signal from the transfer speed detector 448 or a signal from the transfer interface control signal receiver 446.

It should be noted that the number of the interfaces selected by the transfer interface switching controller 442 is not limited to one, and may be plural.

The transfer interface control signal receiver 446 receives a signal from the operation signal controller 520 described below referring to FIG. 15, and outputs the received signal to the transfer interface switching controller 442.

The transfer speed detector 448 acquires the data transfer speed information via the overall controller 404, and stores the acquired data transfer speed information in the transfer speed actual performance history database 450.

The transfer speed detector 448 judges based on the acquired data transfer speed information whether or not the current data transfer speed is higher than a predetermined speed.

When the current data transfer speed is lower than the predetermined speed, the transfer speed detector 448 determines the interface to be connected based on the data transfer speed information in the transfer speed actual performance history database 450.

As a result, the boot object transfer path which can transfer the data at the highest speed can be determined to allow the optimization of the data transfer speed.

Further, the transfer speed detector 448 outputs a signal indicating the determined interface to the transfer interface switching controller 442.

The transfer interface switching controller 442 makes a request for a signal for switching control to the transfer interface controller 444 or the emulation controller 452 according to the selected interface.

Specifically, when the selected interface is a transfer interface #j (j is an integer equal to or larger than 1 and equal to or smaller than M; however all the j's are not always the same number), the transfer interface switching controller 442 makes a request for the signal enabling the use of the transfer interface #j to the transfer interface #j controller 444-j.

Further, when the transfer interface #j is selected to emulate another virtual device, the transfer interface switching controller 442 makes a request for a signal for emulating the selected virtual device to the emulation controller 452.

The transfer interface #j controller 444-j controls the data transfer processing via the transfer interface #j.

Further, the transfer interface #j controller 444-j outputs a signal for enabling the use of the transfer interface #j to the transfer interface switching controller 442 based on the request signal from the transfer interface switching controller 442.

The emulation controller 452 selects the virtual device to be emulated by the transfer interface from the virtual device database 454 based on the request signal from the transfer interface switching controller 442.

The emulation controller 452 also outputs a signal for allowing the transfer interface to emulate the selected virtual device to the transfer interface switching controller 442.

In the above-mentioned manner, the boot object transfer path for transferring the booting data is determined.

Further, the transfer interface switching controller 442 outputs information about the selected boot object transfer path (boot object transfer path information) to the encrypted transfer path controller 456.

The encrypted transfer path controller 456 makes a search to determine whether or not the boot object transfer path information from the transfer interface switching controller 442 is stored in the safety evaluation database 458.

The safety evaluation database 458 stores the boot object transfer path information and a degree of safety of the boot object transfer path in association with each other.

The encrypted transfer path controller 456 performs control for encryption processing described below when the boot object transfer path information is not stored in the safety evaluation database 458 and, even if the boot object transfer path information is stored, the degree of safety of the boot object transfer path is lower than a predetermined value.

Specifically, the encrypted transfer path controller 456 controls processing for allowing the encryption key information to be exchanged with the boot source device 2 via the boot object transfer path having a degree of safety higher than the predetermined value.

The encrypted transfer path controller 456 also controls processing of encrypting the booting data when the booting data is transferred via the boot object transfer path having the above-mentioned degree of safety lower than the predetermined value.

Further, the encrypted transfer path controller 456 outputs a signal for executing the above-mentioned processing to the transfer interface switching controller 442 and the communication handler 400.

The transfer interface switching controller 442 performs processing for establishing the boot object transfer path having the degree of safety higher than the predetermined value as a path for transferring the encryption key information.

The communication handler 400 performs processing of allowing the encryption key information to be exchanged with the boot source device 2 and processing of encrypting the booting data.

For example, with regard to the safety evaluation database 458, a degree of safety higher than the predetermined value can be defined for a highly reliable boot object transfer path whose connections are all wired.

Further, for example, when a wireless LAN interface having a degree of safety lower than the predetermined value is used as a new transfer interface, the encrypted transfer path controller 456 controls the encryption at the interface level, for example, in the case of the wireless LAN, the setting of the ESSID, an encryption method and the encryption key at the link level, or the dynamic processing of a data packet actually transferred via the wireless LAN into encrypted data on the sending side and the decryption of the data on the receiving side at the data level.

It should be noted that the transfer controller 44 may perform the processing in cooperation with the transfer controller 24 of the boot source device program 20. Alternatively, only any of the transfer controller 44 and the transfer controller 24 may perform the processing.

After the overall controller 404 (FIG. 11) including the transfer interface which is not supported by the BIOS 402 is enabled, the overall controller 404 outputs a booting data request signal for the boot target device 4 to the booting data request sender 408.

The booting data request sender 408 sends the booting data request signal from the overall controller 404 to the boot source device 2 via the communication handler 400 and the transfer interface.

The booting data receiver 410 receives the OS boot up processing data, the boot graphics data, the boot audio data, and the authentication information from the boot source device 2, and outputs the thus received booting data to the booting data caching storage 412.

The booting data caching storage 412 caches and manages the OS boot up processing data, the boot graphics data, the boot audio data, and the authentication information from the booting data receiver 410.

Figure 13:
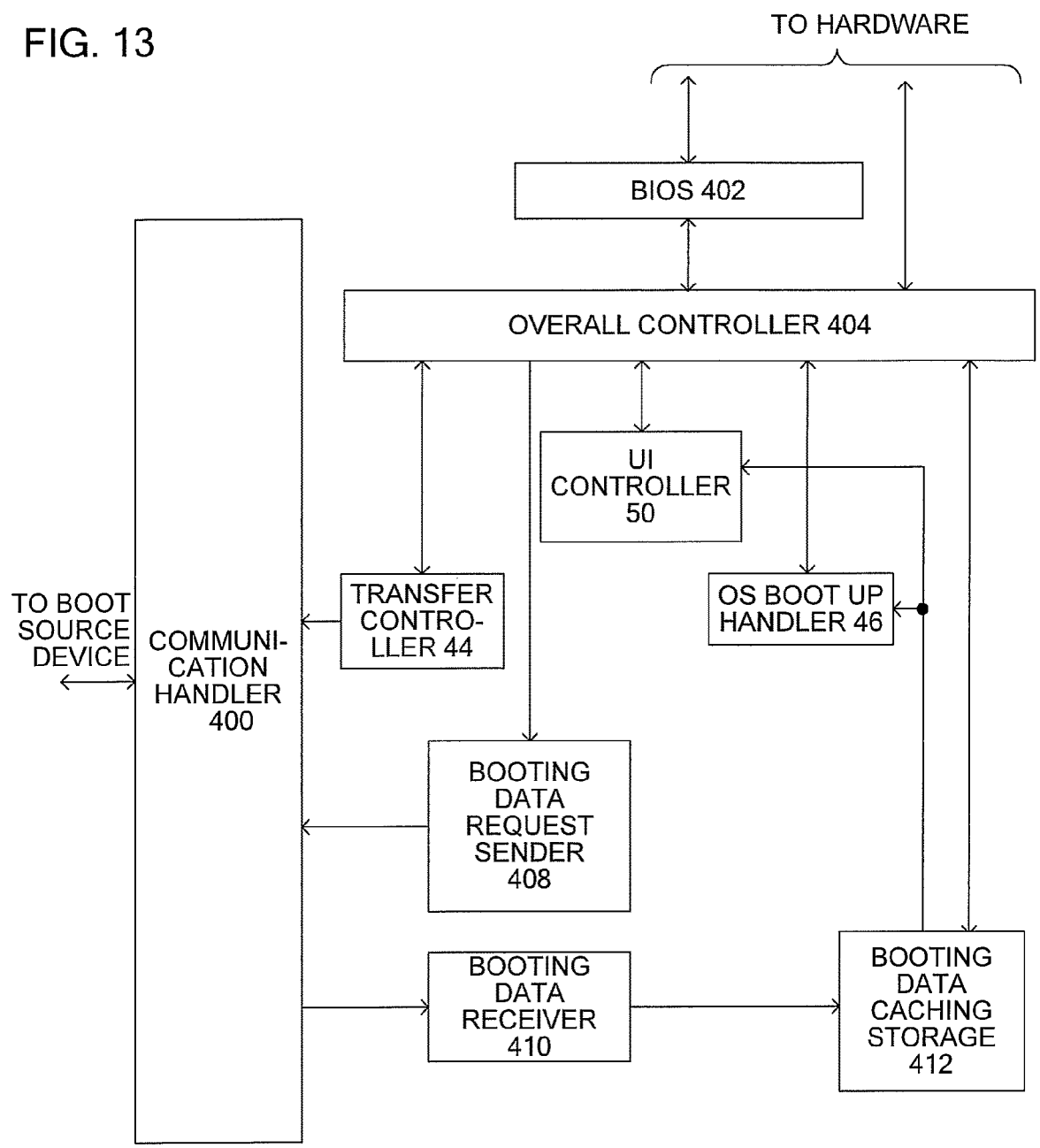
FIG. 13 is a view illustrating a configuration of a second stage of the boot target device program operating on the boot target device illustrated in FIG. 1 according to an embodiment of the present invention.

FIG. 13 is a view illustrating a configuration of a second stage of the boot target device program 40 operating on the boot target device 4 illustrated in FIG. 1.

As illustrated in FIG. 13, the boot target device program 40 in the second stage includes the communication handler 400, the BIOS 402, the overall controller 404, the booting data request sender 408, the booting data receiver 410, the booting data caching storage 412, the transfer controller 44, an OS boot up handler 46, and a UI controller 50.

With the above-mentioned components, the boot target device program 40 in the second stage executes the boot up processing of an application such as the OS based on the OS boot up processing data.

In the boot target device program 40, the overall controller 404 requests the booting data caching storage 412 to output the OS boot up processing data, the boot graphics data, the boot audio data, and the authentication information.

The booting data caching storage 412 outputs the OS boot up processing data, the boot graphics data, the boot audio data, and the authentication information in response to the request from the overall controller 404.

The overall controller 404 performs processing of making the OS boot up handler 50 and the UI controller 46 functional based on the received booting data.

Figure 14:
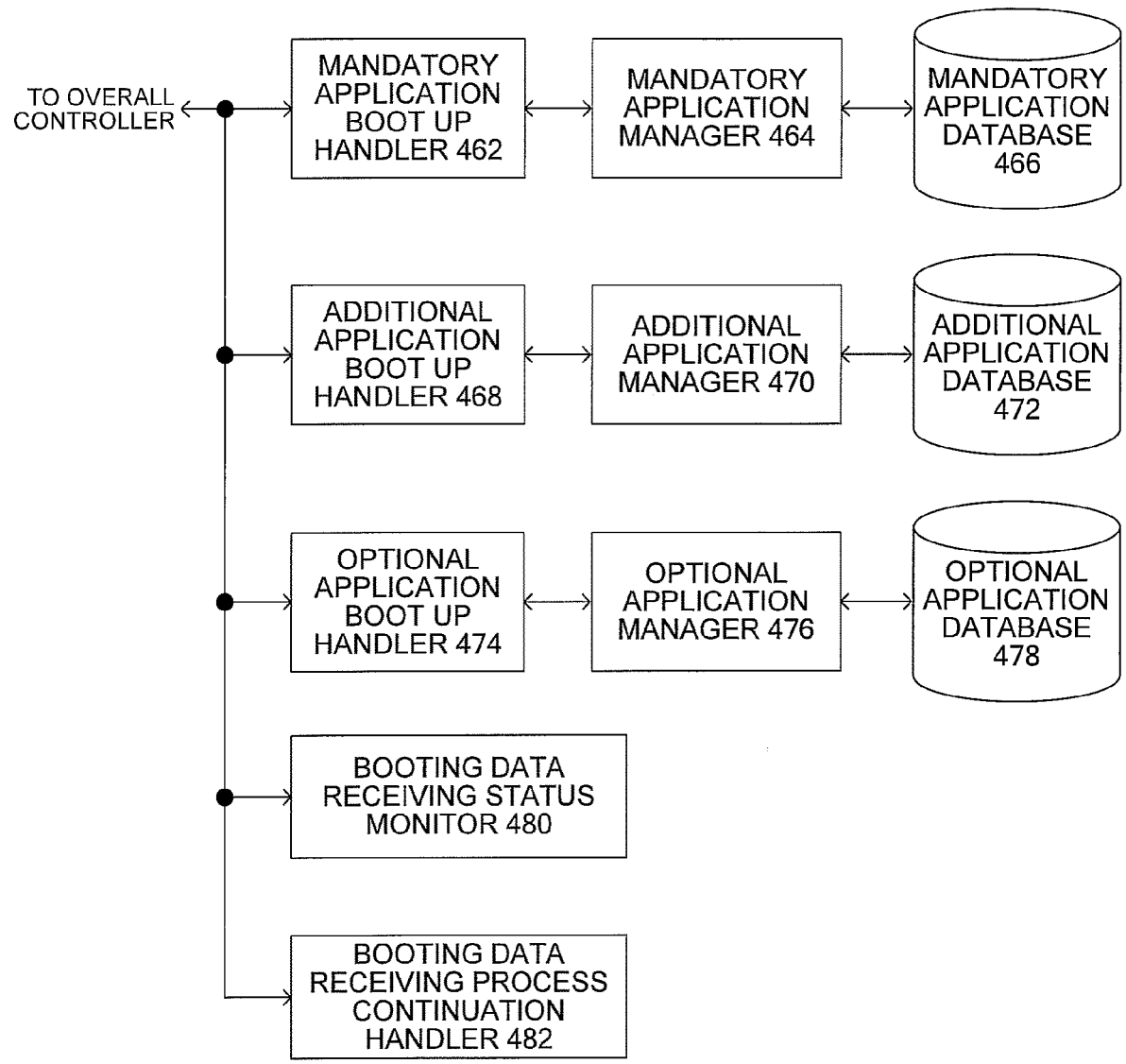
FIG. 14 is a view illustrating a configuration of an OS boot up handler illustrated in FIG. 13 according to an embodiment of the present invention.

FIG. 14 is a view illustrating a configuration of the OS boot up handler 46 illustrated in FIG. 13.

As illustrated in FIG. 14, the OS boot up handler 46 includes a mandatory application boot up handler 462, a mandatory application manager 464, a mandatory application database 466, an additional application boot up handler 468, an additional application manager 470, an additional application database 472, an optional application boot up handler 474, an optional application manager 476, an optional application database 478, a booting data receiving status monitor 480, and a booting data receiving process continuation handler 482.

With the above-mentioned components, the OS boot up handler 46 performs processing of booting up the OS and an application in association.

In the OS boot up handler 46, the mandatory application boot up handler 462 performs processing for booting up the application which is mandatory for booting up the OS, for example, the kernel.

The OS described herein can be booted up not only on a real machine but also on a virtual machine.

Moreover, the mandatory application boot up handler 462 acquires data necessary for the boot up processing of the mandatory application (mandatory application data) from the overall controller 404, and outputs the acquired data to the mandatory application manager 464 as needed.

The mandatory application manager 464 manages the mandatory application data from the mandatory application boot up handler 462, and outputs the mandatory application data to the mandatory application boot up handler 462 as needed.

The mandatory application manager 464 also stores the mandatory application data received from the mandatory application boot up handler 462 in the mandatory application database 466.

The additional application boot up handler 468 performs processing for pre-transferring an application such as, for example, office software, which is actually frequently used by the user, to make the application immediately available on the booted OS.

The additional application boot up handler 468 also acquires data necessary for the boot up processing of the additional application (additional application data) from the overall controller 404, and outputs the acquired data to the additional application manager 470 as needed.

The additional application manager 470 manages the additional application data from the additional application boot up handler 468, and outputs the additional application data to the additional application boot up handler 468 as needed.

The additional application manager 470 also stores the additional application data received from the additional application boot up handler 468 in the additional application database 472.

The optional application boot up handler 474 performs processing for booting up an application loaded as needed, such as, for example, game software.

The optional application boot up handler 474 acquires data necessary for the optional application boot up processing (optional application data) from the overall controller 404, and outputs the data to the optional application manager 476 as needed.

The optional application manager 476 manages the optional application data from the optional application boot up handler 474, and outputs the optional application data to the optional application boot up handler 474 as needed.

The optional application manager 476 stores the optional application data received from the optional application boot up handler 474 in the optional application database 478.

The booting data receiving status monitor 480 outputs a signal for requesting information indicating a receiving status of the booting data from the boot source device 2 (booting data receiving status information) to the overall controller 404.

Herein, the booting data receiving status information includes a status indicating a degree of completion of the reception of the booting data at the current time.

The overall controller 404 accesses the booting data caching storage 412 in response to the request signal of the booting data receiving status information to acquire the booting data receiving status information, and outputs the acquired booting data receiving status information to the booting data receiving status monitor 480.

The booting data receiving status monitor 480 monitors the receiving status of the booting data based on the booting data receiving status information from the overall controller 404.

The booting data receiving process continuation handler 482 performs processing for allowing the continuation of the reception of the booting data when the reception of the booting data is temporarily interrupted due to the switching of the transfer interface or the like and then is to be restarted.

Specifically, the booting data receiving process continuation handler 482 acquires the booting data receiving status information from the booting data receiving status monitor 480, and performs processing for allowing the continuation of the reception of the booting data based on the booting data receiving status information.

Figure 15:
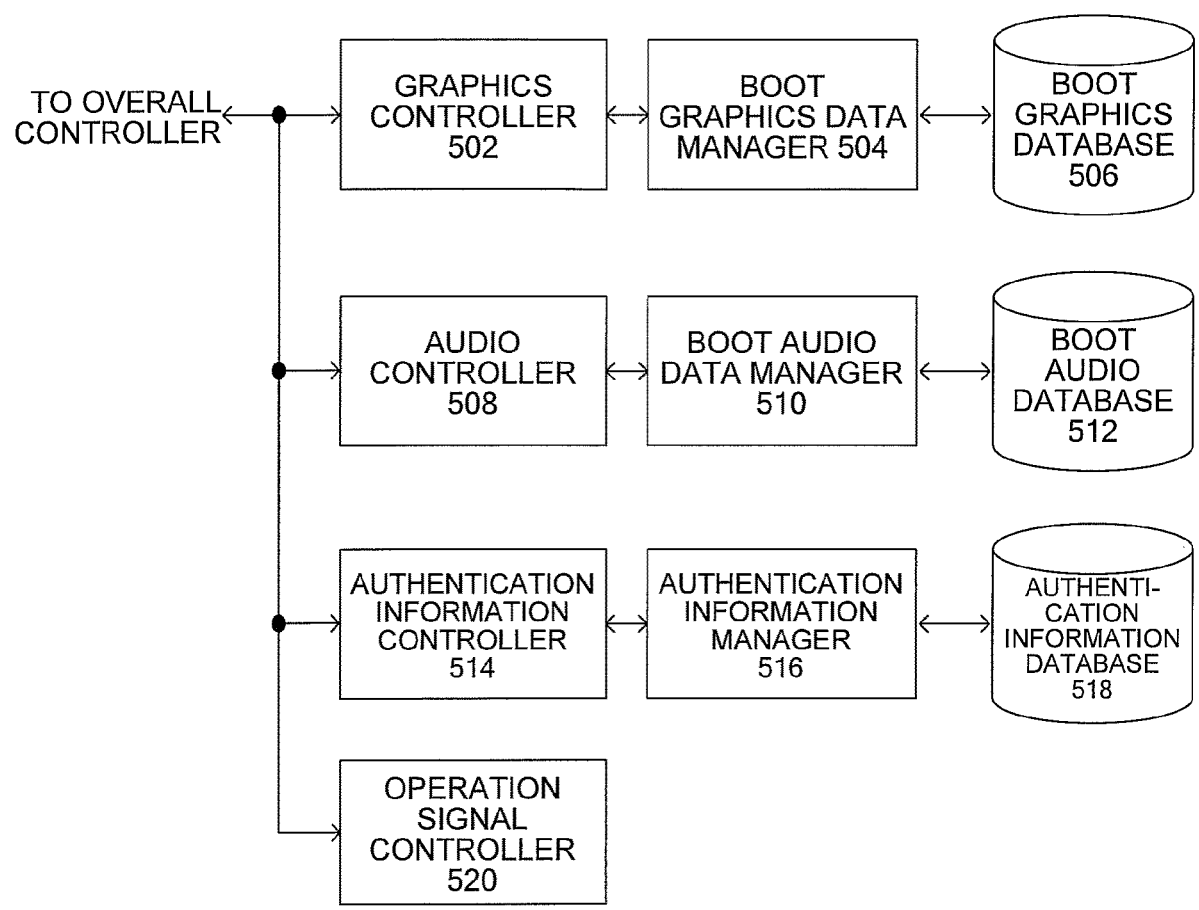
FIG. 15 is a view illustrating a configuration of a UI controller illustrated in FIG. 13 according to an embodiment of the present invention.

FIG. 15 is a view illustrating a configuration of the UI controller 50 illustrated in FIG. 13.

As illustrated in FIG. 15, the UI controller 50 includes a graphics controller 502, a boot graphics data manager 504, a boot graphics database 506, an audio controller 508, a boot audio data manager 510, a boot audio database 512, an authentication information controller 514, an authentication information manager 516, an authentication information database 518, and an operation signal controller 520.

With the above-mentioned components, the UI controller 50 performs processing regarding the interface with the user.

In the UI controller 50, the graphics controller 502 controls a graphic displayed on the I/O device 126 of the boot target device 4 such as a monitor while the boot target device 4 is being booted.

The displayed graphics include, for example, an authentication graphic such as a password input graphic for user authentication, a guidance display graphic showing a boot processing procedure, a progression status display graphic showing a status of progression of the boot processing, an animation and the like.

The graphics controller 502 acquires graphics data of the graphic displayed on the monitor or the like from the overall controller 404, and outputs the acquired data to the boot graphics data manager 504 as needed.

The boot graphics data manager 504 manages the graphics data from the graphics controller 502, and outputs the graphics data to the graphics controller 502 as needed.

The boot graphics data manager 504 also stores the graphics data received from the graphics controller 502 in the boot graphics database 506.

The audio controller 508 controls a sound emitted from the I/O device 126 of the boot target device 4 such as a speaker while the boot target device 4 is being booted.

The emitted sound includes, for example, BGM, a guidance display sound indicating the boot processing procedure, and the like.

The audio controller 508 acquires audio data of the sound emitted from the speaker or the like from the overall controller, and outputs the acquired data to the boot audio data manager 510 as needed.

The boot audio data manager 510 manages the audio data from the audio controller 508, and outputs the audio data to the audio controller 508 as needed.

The boot audio data manager 510 also stores the audio data received from the audio controller 508 in the boot audio database 512.

The authentication information controller 514 controls processing for authenticating the user while the boot target device 4 is being booted.

Specifically, when the user inputs authentication information such as a password by using the I/O device 126 such as the keyboard according to the authentication graphic, the authentication information controller 514 acquires the authentication information from the overall controller 404.

Further, the authentication information controller 514 acquires the authentication information from the authentication information manager 516 to determine whether or not the authentication information from the user is correct.

If the authentication information from the user is correct, the authentication information controller 514 outputs a signal for allowing the continuation of the boot processing to the overall controller 404. If not, the authentication information controller 514 outputs a signal for interrupting the boot processing to the overall controller 404.

The authentication information manager 516 manages the authentication information of the user, which is stored in the authentication information database 518, and outputs the authentication information to the authentication information controller 514 as needed.

Herein, the authentication information includes, for example, not only the password input through the keyboard, but also biometric information such as a fingerprint input through a fingerprint input device (not shown) connected to the boot target device 4.

The operation signal controller 520 performs control for the boot processing according to an operation signal while the boot target device 4 is being booted.

Specifically, when the user operates the I/O device 126 such as the keyboard according to the guidance display by the graphics controller 502 and the audio controller 508, the operation signal controller 520 acquires an operation signal according to the operation from the overall controller 404.

Further, the operation signal controller 520 judges the content of the operation signal, and outputs a signal for performing the boot processing according to the content to the overall controller 404.

It should be noted that the UI controller 50 may perform the processing in cooperation with the UI controller 28 of the boot source device program 20. Alternatively, only any of the UI controller 50 and the UI controller 28 may perform the processing.

Overall Operation of the Device Booting System 1

Next, an overall operation of the device booting system 1 will be described.

Figure 16:
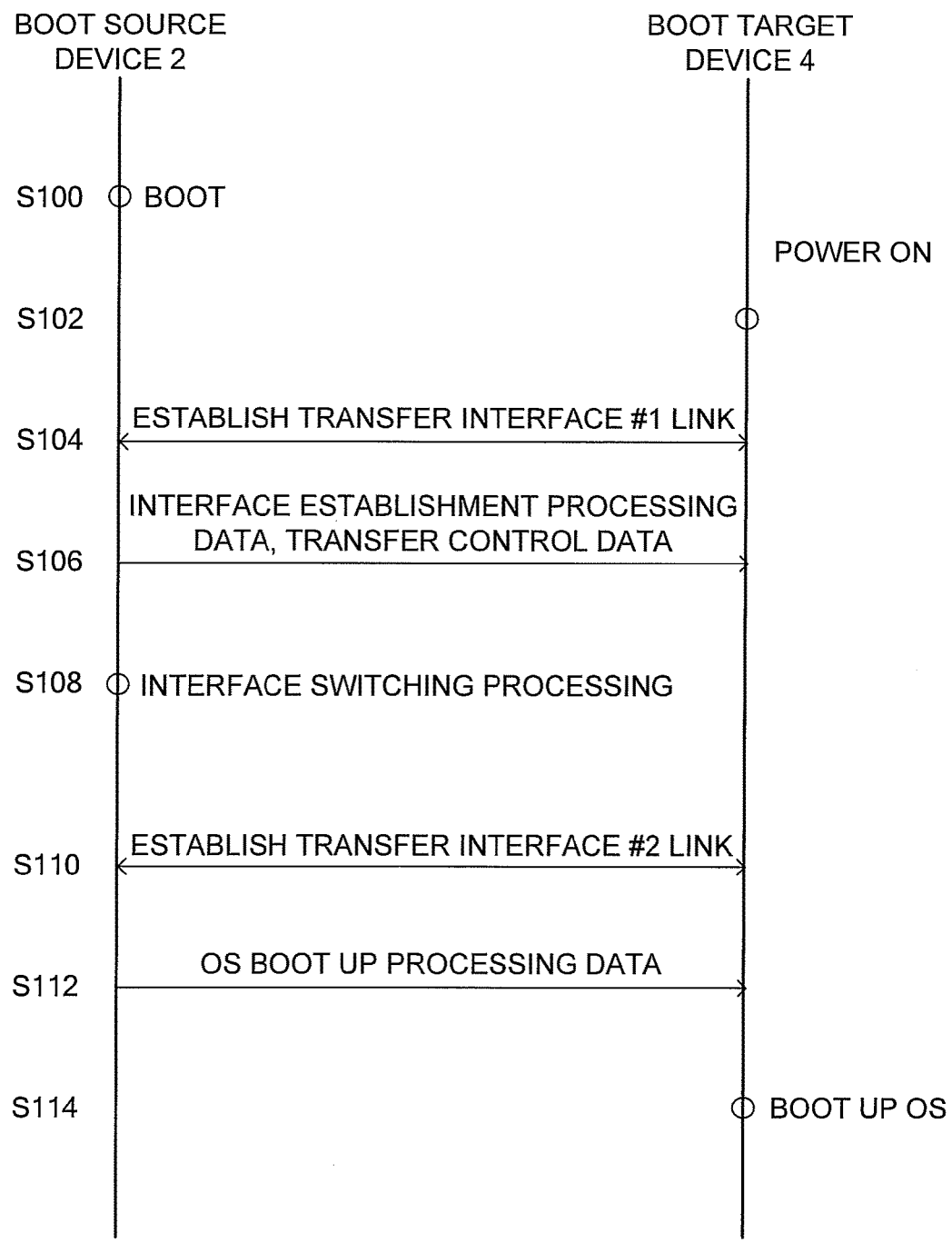
FIG. 16 is a communication sequence diagram illustrating an overall operation of the device booting system illustrated in FIG. 1 according to an embodiment of the present invention.

FIG. 16 is a communication sequence diagram showing an overall operation (S10) of the device booting system 1 illustrated in FIG. 1.

As illustrated in FIG. 16, in Step 100 (S100), the boot source device 2 is booted.

In Step S102 (S102), the boot target device 4 is powered ON to boot the BIOS 402.

In Step S104 (S104), the connection of the transfer interface #1 supported by the BIOS 402 is established to allow the data transfer via the transfer interface #1.

In Step S106 (S106), the boot target device 4 receives the interface establishment processing data and the transfer control data from the boot source device 2.

In Step S108 (S108), the boot source device 2 performs the processing of switching the interface.

It should be noted that Step S108 may alternatively be executed by the boot target device 4.

Figure 6:
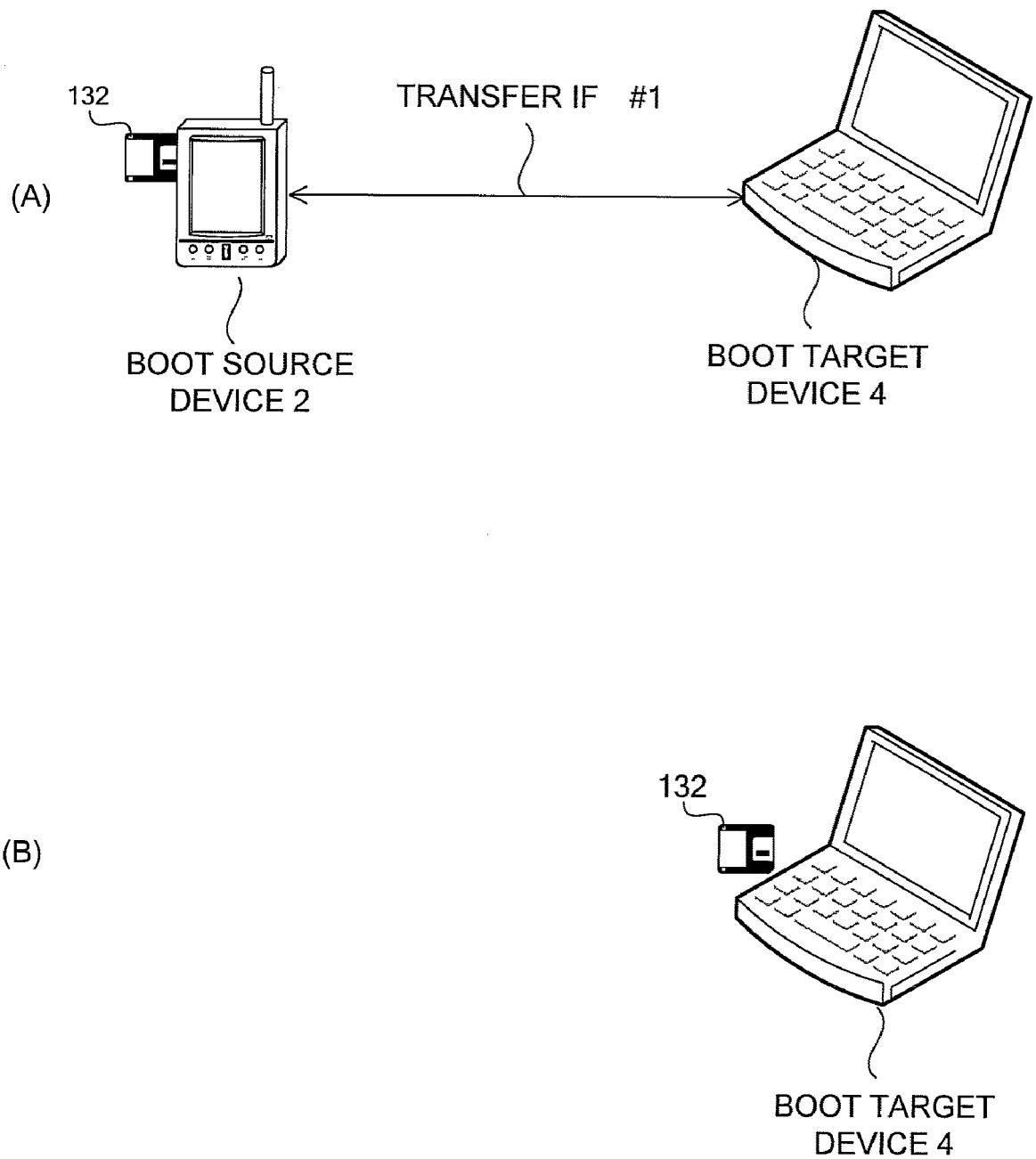
FIGS. 6A-B are views exemplifying an embodiment of a method of booting the boot target device by using the boot source device in the device booting system illustrated in FIG. 1.

Step S108 may also be executed by inserting the storage medium 132, which stores the booting data, into the boot target device 4 from the boot source device 2, as illustrated in FIG. 6 or the like.

In Step S110 (S110), the connection of the interfaces including the transfer interface #2 which is not directly supported by the BIOS 402 is established to allow the data transfer via the transfer interface #2.

In Step S112 (S112), the boot target device 4 receives the OS boot up processing data from the boot source device 2.

It should be noted that Step S112 may be executed prior to S108 and S110. Further, Step S108 may be executed in the middle of S112.

In Step S114 (S114), the boot target device 4 boots up the OS.

It should be noted that the order of each processing illustrated in FIG. 16 may be appropriately changed.

In this embodiment, the boot target device 4 is booted by using the boot source device 2. However, as illustrated in FIG. 7, the booting data may be transferred to the booting target device 4 by switching the interface of the external storage device without using the boot source device 2.

In such a case, the transfer controller 44 of the boot target device program 40 controls the establishment of the connection of the interface with the external storage device.

Further, the first and second objects transferred from the boot source device 2 to the boot target device 4 may be dynamically modified by the boot source device 2 according to the boot target device 4 or the boot object transfer path based on static data stored in the storage device of the boot source device 2.

In the above-mentioned case, the modified first and second objects are in a format which can be properly processed by the boot target device 4 after being transferred to the boot target device 4.

An example in which the objects are processed according to the boot target device 4 will be described below.

For example, in the case where the boot target device 4 is a device having a sufficiently large resource, the optional application may be dynamically changed as the additional application. As a result, the application, which is generally the optional application, may be handled in the same manner as the additional application in a specific boot target device 4.

Moreover, for example, setting information of the application which is automatically booted in the boot target device 4 may be changed by an operation in the boot source device 2 prior to the transfer of the object corresponding to the boot target device 4. As a result, the setting may be changed for the second object. Therefore, a specific application can be executed based on the specific setting in the boot target device 4.

On the other hand, an example in which the objects are modified according to the boot object transfer path will be described below.

For example, when the boot source device 2 emulates the USB CD-ROM drive, a block size for the data transfer may be modified to have 2048 bytes. When the boot source device 2 emulates the USB hard disk drive, the block size may be dynamically cut out to have 512 bytes to execute a modification for the data transfer.

Alternatively, modification processing may be performed in the following manner. For example, for each device to be emulated, an automatic boot code loaded by the BIOS or an IPL (Initial Program Loader) according to the BIOS characteristics of the firmware of the boot target device 4 is prepared. A content of an area used for the automatic boot by the firmware of the boot target device 4, for example, a content of an area of an MBR (Master Boot Record) for emulation of the USB hard disk drive, in the first object, is appropriately replaced.

By the above-mentioned processing, the boot source device 2 can deal with a behavior different for each firmware of the boot target device 4.

Further, for example, when the data being currently transferred is encrypted in units of blocks or files as needed, dynamic compression processing may be performed to reduce the data size being currently transferred. Alternatively, in order to improve a transfer efficiency on a line having relatively bad quality such as a transfer via the wireless interface, such a modification as to add an error correction code to the transferred data to increase a redundancy may be performed.

INDUSTRIAL APPLICABILITY

In order to cope with the above-mentioned problems to be solved by the present invention, the present invention can be used for a highly convenient booting system, which can be practically used even in combination of a boot source device, a storage device and a boot target device, which are designed at low cost or for a general use for the purpose of, in particular, mass production.

What is claimed is:

1. A booting system including a boot target device and a boot source device having a first object and a second object for booting the boot target device, the boot target device and the boot source device being connectable by using at least one interface, the first object and the second object being transferred via boot object transfer paths using at least one of the at least one interface, the booting system comprising:
   a first transfer module for transferring the first object from the boot source device via a first boot object transfer path using a first interface to the boot target device;
   an interface enabling module for causing the boot target device to boot the first object to make the at least one interface functional;
   a transfer path switching module for switching a transfer path to enable at least one boot object transfer path using the interface that has been made functional;
   a second transfer module for transferring the second object from the boot source device via the at least one boot object transfer path to the boot target device; an object boot up module for causing the boot target device to boot the second object; and
   an encryption key exchanging module for causing the boot source device and the boot target device to exchange a key used for encryption via the boot object transfer path having a degree of safety higher than a predetermined value when the degree of safety of the boot object transfer path is lower than the predetermined value.

2. The booting system according to claim 1, wherein the second transfer module transfers the second object from the boot source device to the boot target device in a parallel distributed manner via each of at least two boot object transfer paths.

3. The booting system according to claim 1, wherein the boot target device comprises:
   an object transfer module for transferring the second object; and
   a transfer continuation module for allowing transfer of the second object to be continued via the boot object transfer path switched by the transfer path switching module when the at least one object transfer path is switched after start of the transfer of the second object.

4. The booting system according to claim 1, wherein the boot source device comprises a dynamical object modification module for dynamically modifying the first object and the second object according to the boot target device or the boot object transfer path.

5. The booting system according to any one of claim 1, further comprising:
   a safety detection module for detecting safety of the boot object transfer path; and
   an encrypted transfer path establishing module for establishing the boot object transfer path having the degree of safety lower than the predetermined value as an encrypted boot object transfer path.

6. The booting system according to any one of claim 1, further comprising:
   a transfer speed monitoring module for monitoring a transfer speed of the second object by the second transfer module; and
   a transfer path searching module for searching for the boot object transfer path having the transfer speed of the second object higher than the monitored transfer speed based on the monitored transfer speed,
   wherein the transfer path switching module switches or adds the transfer path to enable the searched boot object transfer path.

7. A booting system comprising a boot target device and a storage device storing a first object and a second object for booting the boot target device, the boot target device and the storage device being connectable by using at least one interface, the first object and the second object being transferred via boot object transfer paths using at least one of the at least one interface,
   wherein the boot target device comprises:
   a first object loading module for loading the first object transferred via a first boot object transfer path using a first interface from the storage device;
   an interface enabling module for booting the loaded first object to perform processing to make at least one interface functional;
   a transfer path switching module for switching the transfer path to enable at least one boot object transfer path using the interface that has been made functional;
   a second object loading module for loading the second object transferred from the storage device via a second boot object transfer path using any of the at least one functional interface;
   an object boot up module for booting the second object; and
   an encryption key exchanging module for causing the storage device and the boot target device to exchange a key used for encryption via the boot object transfer path having a degree of safety higher than a predetermined value when the degree of safety of the boot object transfer path is lower than the predetermined value.

8. The booting system according to claim 7, wherein the boot target device further comprises a transfer continuation module for allowing transfer of the second object to be continued via the boot object transfer path switched by the transfer path switching module when the at least one boot object transfer path is switched after start of the transfer of the second object.

9. A booting method for a booting system including a boot target device and a boot source device having a first object and a second object for booting the boot target device, the boot target device and the boot source device being connectable by using at least one interface, the first object and the second object being transferred via boot object transfer paths using at least one of the at least one interface, the booting method comprising:
a first transfer step of transferring the first object from the boot source device to the boot target device via a first boot object transfer path using a first interface;
an interface enabling step of causing the boot target device to boot the first object to make at least one interface functional;
a transfer path switching step of switching the transfer path to enable at least one boot object transfer path using the interface that has been made functional;
a second transfer step of transferring the second object from the boot source device to the boot target device via the at least one boot object transfer path;
an object boot up step of causing the boot target device to boot the second object; and
an encryption key exchanging step of causing the boot source device and the boot target device to exchange a key used for encryption via the boot object transfer path having a degree of safety higher than a predetermined value when the degree of safety of the boot object transfer path is lower than the predetermined value.

10. A booting method for a booting system including a boot target device and a storage device storing a first object and a second object for booting the boot target device, the boot target device and the storage device being connectable by using at least one interface, the first object and the second object being transferred via boot object transfer paths using at least one of the at least one interface, the booting method in the boot target device comprising:
a first object loading step of loading the first object transferred from the storage device via a first boot object transfer path using a first interface;
an interface enabling step of booting the loaded first object to make the at least one interface functional;
a transfer path switching step of switching the transfer path to enable at least one boot object transfer path using the interface that has been made functional;
a second object loading step of loading the second object transferred via a second boot object transfer path using any of the at least one functional interface from the storage device;
an object boot up step of booting the second object; and
an encryption key exchanging step of causing the storage device and the boot target device to exchange a key used for encryption via the boot object transfer path having a degree of safety higher than a predetermined value when the degree of safety of the boot object transfer path is lower than the predetermined value.

11. A boot program for a booting system comprising a boot target device corresponding to a computer and a boot source device corresponding to a computer including a first object and a second object for booting the boot target device, the boot target device and the boot source device being connectable by using at least one interface, the first object and the second object being transferred via boot object transfer paths using at least one of the at least one interface, the boot program causing the boot target device or the boot source device to execute:
a first transfer step of transferring the first object from the boot source device to the boot target device via a first boot object transfer path using a first interface;
an interface enabling step of causing the boot target device to boot the first object to make at least one interface functional;
a transfer path switching step of switching the transfer path to enable at least one boot object transfer path using the interface that has been made functional;
a second transfer step of transferring the second object from the boot source device to the boot target device via the at least one boot object transfer path;
an object boot up step of causing the boot target device to boot the second object; and
an encryption key exchanging step of causing the boot source device and the boot target device to exchange a key used for encryption via the boot object transfer path having a degree of safety higher than a predetermined value when the degree of safety of the boot object transfer path is lower than the predetermined value.

12. A boot program for a booting system comprising a boot target device corresponding to a computer and a storage device storing a first object and a second object for booting the boot target device, the boot target device and the storage device being connectable by using at least one interface, the first object and the second object being transferred via boot object transfer paths using at least one of the at least one interface, the boot program causing the boot target device to execute:
a first object loading step of loading the first object transferred from the storage device via a first boot object transfer path using a first interface;
an interface enabling step of booting the loaded first object to make the at least one interface functional;
a transfer path switching step of switching the transfer path to enable at least one boot object transfer path using the interface that has been made functional;
a second object loading step of loading the second object transferred via a second boot object transfer path using any of the at least one functional interface from the storage device;
an object boot up step of booting the second object; and
an encryption key exchanging step of causing the storage device and the boot target device to exchange a key used for encryption via the boot object transfer path having a degree of safety higher than a predetermined value when the degree of safety of the boot object transfer path is lower than the predetermined value.

\* \* \* \* \*